(12) United States Patent
Hazama et al.

(10) Patent No.: US 8,317,600 B2
(45) Date of Patent: Nov. 27, 2012

(54) GAME DEVICE

(75) Inventors: Manabu Hazama, Tokyo (JP); Keiko Sato, Tokyo (JP); Yasumi Takase, Tokyo (JP); Naohiro Yamamoto, Tokyo (JP); Kota Wakasa, Tokyo (JP); Takashi Nishibori, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 265 days.

(21) Appl. No.: 12/679,229

(22) PCT Filed: Sep. 19, 2008

(86) PCT No.: PCT/JP2008/066968
§ 371 (c)(1),
(2), (4) Date: Mar. 19, 2010

(87) PCT Pub. No.: WO2009/038167
PCT Pub. Date: Mar. 26, 2009

(65) Prior Publication Data
US 2010/0234096 A1 Sep. 16, 2010

(30) Foreign Application Priority Data

Sep. 21, 2007 (JP) .................................. 2007-244778
Sep. 21, 2007 (JP) .................................. 2007-244779

(51) Int. Cl.
*A63F 9/24* (2006.01)
(52) U.S. Cl. ................ 463/23; 463/7; 463/43
(58) Field of Classification Search ............... 463/7, 23, 463/43, 9
See application file for complete search history.

(56) References Cited

U.S. PATENT DOCUMENTS

2003/0109297 A1 6/2003 Fukutome
2009/0036201 A1 2/2009 Okuda et al.

FOREIGN PATENT DOCUMENTS

JP 9-225141 9/1997
JP 11-226264 8/1999
(Continued)

OTHER PUBLICATIONS

International Search Report mailed Dec. 22, 2008 in International Application No. PCT/JP2008/066968.

(Continued)

*Primary Examiner* — Peter DungBa Vo
*Assistant Examiner* — Damon Pierce
(74) *Attorney, Agent, or Firm* — Sughrue Mion, PLLC

(57) ABSTRACT

A game device of a computer game includes plural unit games, each of which can be completed when a requirement for completion is satisfied. The game device includes: a rule storage unit for storing rules of the computer game, in which the rules include rules stipulating the requirement for completion of each of the plural unit games and rules stipulating a content of play of each of the plural unit games; a difficulty changer for rewriting a rule stored in the rule storage unit so as to change a level of difficulty for completion of at least one unit game among the plural unit games; and a play processor for conducting a unit game selection process for enabling a player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit.

25 Claims, 18 Drawing Sheets

FOREIGN PATENT DOCUMENTS

| | | |
|---|---|---|
| JP | 2000-107449 | 4/2000 |
| JP | 2001-170365 | 6/2001 |
| JP | 2003-117238 | 4/2003 |
| JP | 3934661 | 3/2007 |

OTHER PUBLICATIONS

Taiwanese Office Action issued in Taiwanese Patent Application No. 09736118 dated Jul. 24, 2012.

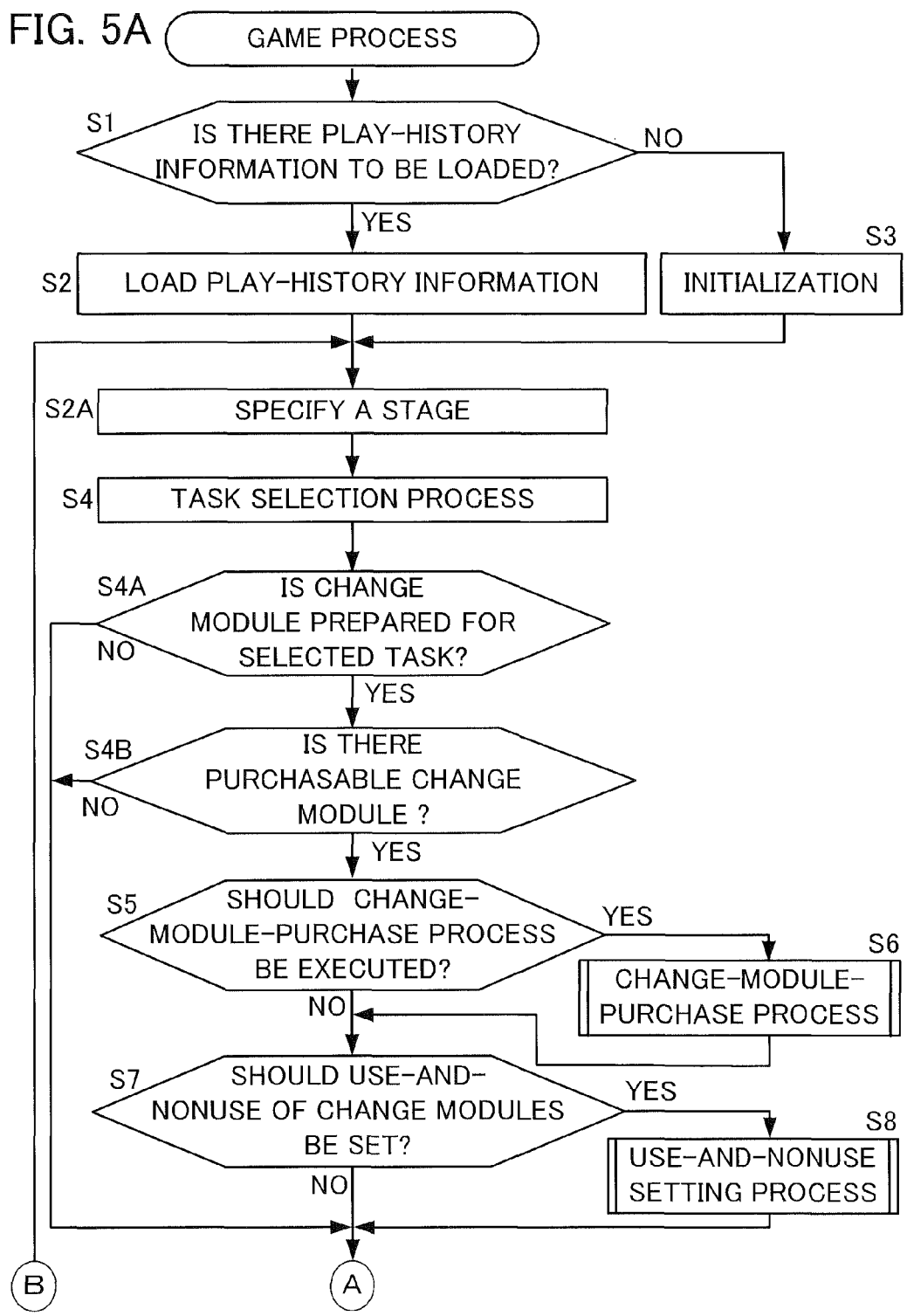

FIG. 9

| TASK (SEQUENCE) NAME |||||
|---|---|---|---|---|
| BASIC DIFFICULTY FOR COMPLETION |||||
| REQUIREMENT FOR COMPLETION<br>NECESSARY SCORE: 100<br>MISS COUNT LIMIT: 3 |  | DIFFICULTY IN PLAY<br>TEMPO: NORMAL |||
| CHANGE MODULE NAME | USE/ NONUSE | CHANGE EFFECT || NUMBER |
| AAAA | USE | HASTEN TEMPO || 2 |
| BBBB | NONUSE | SLOW DOWN TEMPO || 1 |
| CCCC | USE | NECESSARY SCORE: 200 || 1 |
| DDDD | NONUSE | MISS COUNT LIMIT: 2 || 2 |
|  |  | ⋮ |||

FIG. 12

| TASK NAME | SCORE | MISS COUNT | CHANGE MODULE NAME | CHANGE EFFECT |
|---|---|---|---|---|
| FIRST TASK OF FIRST STAGE | 249 | 2 | AAAA | HASTEN TEMPO |
|  |  |  | AAA1 | MISS COUNT LIMIT: 2 |
|  |  |  | ABAB | NECESSARY SCORE: 200 |
| THIRD TASK OF FIRST STAGE | 368 | 1 |  |  |
| THIRD TASK OF SECOND STAGE | 305 | 2 | CAAA | SLOW DOWN TEMPO |
|  |  |  | CAA1 | MISS COUNT LIMIT: 4 |
| SECOND TASK OF THIRD STAGE | 402 | 2 | DAAA | NECESSARY SCORE: 150 |

PLAY HISTORY

FIG. 14

| TASK (SEQUENCE) NAME | | | |
|---|---|---|---|
| BASIC DIFFICULTY FOR COMPLETION | | | |
| REQUIREMENT FOR COMPLETION NECESSARY SCORE: 100 MISS COUNT LIMIT: 3 | | DIFFICULTY IN PLAY TEMPO: NORMAL | |
| CHANGE MODULE NAME | USE/ NONUSE | CHANGE EFFECT | NUMBER |
| AAAA | USE | HASTEN TEMPO | 2 |
| BBBB | NONUSE | SLOW DOWN TEMPO | 1 |
| CCCC | USE | NECESSARY SCORE: 200 | 1 |
| DDDD | NONUSE | MISS COUNT LIMIT: 2 | 2 |
| ⋮ | | | |

GAME DEVICE

TECHNICAL FIELD

The present invention relates to game devices that have multiple unit games to be completed by a player, and in which the level of difficulty for completion of at least one of the unit games can be adjusted.

BACKGROUND ART

A clearance-type game is a type of computer game. The clearance-type game includes multiple unit games (e.g., stages or tasks). The level of difficulty for completion of each unit game is predetermined. Each unit game is completed when a requirement for completion is satisfied. In this kind of game, once a unit game is completed, a player can proceed to play a next unit game or can select a unit game that the player will play next.

A game device of the clearance-type game is described in JP-A-9-225141. In the clearance-type game, when a unit game is completed, the player of the unit game can play another unit game in which the level of difficulty is higher than the completed unit game.

DISCLOSURE OF THE INVENTION

Problems to be Solved by the Invention

In the design of a clearance-type game, if the difficulty for completion of each unit game is not set appropriately, the motivation of players of the game may be decreased. For instance, when the level of difficulty for completion of a unit game is excessively high, most players are likely to give up trying to complete the unit game and to give up trying to play a subsequent unit game. Conversely, when the level of difficulty for completion of a unit game is excessively low, the player of the unit game may quickly become bored at least with that unit game. For this reason, previously, an appropriate level of difficulty for completion has been set statistically by large-scale experiments. However, the experiments and the labor for determining levels of difficulty for completion require great care.

Accordingly, the present invention provides a game device in which the level of difficulty for completion of a unit game can be set appropriately for a player, a computer program for implementation of the game device, and an information storage medium storing the computer program.

Means for Solving the Problems

In accordance with an aspect of the present invention, a game device includes: a rule storage unit for storing rules of a computer game including plural unit games, each of which can be completed when a requirement for completion is satisfied, the rules including rules stipulating the requirement for completion of each of the plural unit games and rules stipulating a content of play of each of the plural unit games; a difficulty changer for rewriting a rule stored in the rule storage unit so as to change a level of difficulty for completion of at least one unit game among the plural unit games; and a play processor for conducting a unit game selection process for enabling a player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit.

In this description, a "game" includes a multi-player game in which more than one player or more than one team competes or cooperates with others, a single-player game played for achieving a goal or for pleasure, that is, a one-person game, and a puzzle game. In this description, the single-player game is disclosed as an example of the game. However, the present invention is not limited to the single-player game, and it covers all types of games. In the present invention, since the level of difficulty for completion is changed in at least one unit game, it is possible to set a level of difficulty for completion of a unit game appropriately for a player without large-scale experiments.

In an embodiment of the present invention, the difficulty changer may rewrite the rule stored in the rule storage unit so as to change the requirement for completion of a unit game. Thus, the requirement for completion according to the level of difficulty for completion of a unit game may be changed.

Preferably, the game device further includes a notifier for outputting a signal for informing the player of a candidate for a change module for changing the level of difficulty for completion of at least one unit game, in which when the candidate for the change module is selected to be used by the player, the difficulty changer rewrites rule stored in the rule storage unit so as to change the level of difficulty for completion of the unit game in accordance with the selected change module. In this situation, if the notified candidate for a change module is preferred for the player, the player selects to use the change module, and then the level of difficulty for completion is changed corresponding to the change module.

More preferably, the game device further includes a notifier for outputting a signal for informing the player of plural candidates for a change module for changing the level of difficulty for completion of at least one unit game, in which the difficulty changer rewrites a rule stored in the rule storage unit so as to change the level of difficulty for completion of the unit game in accordance with a change module selected from among the plural candidates to be used by the player. In this situation, the player can select to use a preferred change module for the player among notified candidates for a change module, and then the level of difficulty for completion of the unit game is changed corresponding to the change module.

More preferably, the game device further includes: a change module storage unit for storing the change module selected to be used by the player as a used change module; and a used-change-module notifier for outputting a signal for informing the player of the used change module stored in the change module storage unit, when the player instructs not to use the used change module, the change module storage unit stores the used change module as a nonused change module and the difficulty changer rewrites the rule stored in the rule storage unit so as to cancel the change of the level of difficulty for completion of the unit game based on the change module. In this instance, the player is notified with the used change module and can select nonuse of the used change module.

Preferably, the rule storage unit stores a rule stipulating a requirement to be achieved during play of the computer game for discontinuing use of the change module already used by the player, and in which as long as the requirement is satisfied, the change module storage unit stores the used change module as a nonused change module and the difficulty changer rewrites the rule stored in the rule storage unit so as to cancel the change in the level of difficulty for completion of the unit game based on the change module. In this instance, since the requirement excepting the player's intention is set to discontinue use of the used change module, the player's motivation in the game can be stimulated to satisfy the requirement.

Preferably, the plural candidates informed by the notifier include a change module for lowering the level of difficulty for completion and a change module for raising the level of difficulty for completion. In this situation, the player can select a change module among multimodal options.

Preferably, the game device further includes a difficulty-history notifier for outputting a signal for reporting information on the level of difficulty of completion of each of the plural unit games having been played by the player upon completion of a specific unit game among the plural unit games. The "information on the level of difficulty for completion" may be information representing a used change module or information representing a change effect resulting from using a change module. In this instance, since the player and people around the player can know the levels of difficulty in play of a series of tasks having been played by the player, the player and the people around the player can know the degree of skill of the player.

Preferably, the notifier outputs a signal for informing the player of a change effect caused by use of each candidate for the change module together with the candidates. In this instance, the player can know the effect caused by use of each candidate for the change module in advance.

Preferably, a number is assigned to each of the candidates for the change module, and the game device further includes a change-module-use permitter for enabling the player to use the candidate for the change module when a sum of the number assigned to a change module already used by the player and stored in the change module storage unit and the number assigned to the candidate of the change module newly selected to be used by the player is equal to or less than a threshold. In this instance, the number of used change modules can be limited. It is necessary for the player to instruct to discontinue use of the already used change module in order to use another change module that the player wishes to use next. As a result, the player can try to use various combinations of change modules.

Preferably, the game device further includes an optimal-change-module determiner, upon selecting a unit game in the unit game selection process, referring to plural candidates of change module for changing the level of difficulty for completion of the unit game and referring to information on skills of the player with respect to play of the computer game, the optimal-change-module determiner determining from among the candidates a change module for changing the level of difficulty for completion of the unit game to the level estimated as optimal for the skill of the player, the notifier outputting a signal for recommending to the player the change module determined by the optimal-change-module determiner. In this instance, the change module estimated optimal for the skill of the player can be recommended to the player.

In another embodiment, the game device may further include: a comparer for comparing a limit value with a record with regard to completion of the at least one unit game derived from the decisions of the decision process by the play processor; and a notifier for outputting a signal for informing the player of a candidate for a change module for changing the level of difficulty for completion of the unit game in accordance with the comparison by the comparer, in which when the candidate for the change module is selected to be used by the player, the difficulty changer rewrites a rule stored in the rule storage unit so as to change the level of difficulty for completion of the unit game in accordance with the selected change module. In this instance, a candidate appropriate for the skill of the player can be suggested to the player in accordance with past records regarding completion of a task. In case in which a notified candidate for a change module is preferable for the player, the player can select to use the change module, and the level of difficulty for completion of the task is changed corresponding to the change module.

Specifically, the game device may include a consecutive-non-completion number determiner for determining a number of consecutive plays for which the decision process by the play processor has decided that the unit game has not been completed, in which when the comparer decides that the number determined by the consecutive-non-completion number determiner is equal to or greater than a first limit value, the notifier outputs a signal for informing the player of a candidate for a change module for lowering the level of difficulty for completion of the unit game. In this instance, a candidate for a change module for lowering the level of difficulty for completion can be recommended to a low-skill player.

The game device may further include a consecutive-completion number determiner for determining a number of consecutive plays for which the decision process by the play processor has decided that the unit game has been completed, in which when the comparer decides that the number determined by the consecutive-completion number determiner is equal to or greater than a second limit value, the notifier outputs a signal for informing the player of a candidate for a change module for raising the level of difficulty for completion of the unit game. In this instance, a candidate for a change module for raising the level of difficulty for completion can be recommended to a high-skill player.

The game device may further include a difficulty restorer for rewriting a rule stored in the rule storage unit so as to restore the level of difficulty for completion of the unit game. In this instance, the level of difficulty for completion can be restored. For example, restoration of level of difficulty for completion may be triggered by specific operation by the player or other events.

More preferably, the rule storage unit stores a rule stipulating a requirement to be achieved during play of the computer game for restoring the level of difficulty for completion of the unit game, and in which, as long as the requirement is satisfied, the difficulty restorer rewrites a rule stored in the rule storage unit so as to restore the level of difficulty for completion of the unit game. In this instance, since the requirement excepting the player's intention is set to discontinue use of the used change module, the player's motivation in the game can be stimulated to satisfy the requirement.

In another embodiment, the game device may further include a comparer for comparing a limit value with a record with regard to completion of the at least one unit game derived from the decisions of the decision process by the play processor, in which the difficulty changer rewrites, on the basis of the comparison by the comparer, a rule stored in the rule storage unit so as to change the level of difficulty for completion of the unit game. In this instance, a level of difficulty for completion of a task can be changed in accordance with past records regarding completion of the task.

Specifically, the game device may include a consecutive-non-completion number determiner for determining a number of consecutive plays for which the decision process by the play processor has decided that the unit game has not been completed, in which when the comparer decides that the number determined by the consecutive-non-completion number determiner is equal to or greater than a first limit value, the difficulty changer rewrites a rule stored in the rule storage unit so as to lower the level of difficulty for completion of the unit game. In this instance, a level of difficulty for completion can be lowered automatically for a low-skill player.

The game device may further include a consecutive-completion number determiner for determining a number of consecutive plays for which the decision process by the play processor has decided that the unit game has been completed, in which when the comparer decides that the number determined by the consecutive-completion number determiner is equal to or greater than a second limit value, the difficulty changer rewrites a rule stored in the rule storage unit so as to raise the level of difficulty for completion of the unit game. In this instance, a level of difficulty for completion can be raised automatically for a high-skill player.

The game device may further include a difficulty restorer for rewriting a rule stored in the rule storage unit so as to restore the level of difficulty for completion of the unit game. In this instance, the level of difficulty for completion can be restored automatically. For example, restoration of a level of difficulty for completion may be triggered by specific operation by the player or other events.

More preferably, the rule storage unit stores a rule stipulating a requirement to be achieved during play of the computer game for restoring the level of difficulty for completion of the unit game, and in which, as long as the requirement is satisfied, the difficulty restorer rewrites a rule stored in the rule storage unit so as to restore the level of difficulty for completion of the unit game. In this instance, since the requirement excepting the player's intention is set to discontinue use of the used change module, the player's motivation of the game can be stimulated to satisfy the requirement.

In accordance with an aspect of the present invention, a computer program according to the present invention used in a computer includes a rule storage unit for storing rules of a computer game including plural unit games, each of which can be completed when a requirement for completion is satisfied, the rules including rules stipulating the requirement for completion of each of the plural unit games and rules stipulating a content of play of each of the plural unit games, the computer program causing the computer to serve as: a difficulty changer for rewriting a rule stored in the rule storage unit so as to change a level of difficulty for completion of at least one unit game among the plural unit games; and a play processor for conducting a unit game selection process for enabling a player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit.

In addition, the present invention may have an information storage medium that stores the computer program. The present invention may also have a transmission medium (e.g., network) that transmits the computer program. That is, the invention may have a medium (data carrier) that machine-readably stores or machine-readably transmits the computer program. Furthermore, the present invention may provide a program element that is a portion of the program or that is the entirety of the program. Furthermore, the present invention may provide a program product that includes a medium storing data that is loaded into a computer as the program.

BRIEF DESCRIPTION OF THE DRAWINGS

FIG. 5A is a portion of a flow chart showing a game process executed by a game device according to an embodiment of the present invention.

FIG. 9 illustrates another example of an image displayed in a display connected to a game device according to an embodiment of the present invention.

FIG. 12 illustrates an example of an image displayed in a display connected to a game device according to the third embodiment of the present invention.

FIG. 14 illustrates an example of an image displayed in a display connected to a game device according to the fourth embodiment of the present invention.

BEST MODE FOR CARRYING OUT THE INVENTION

With reference to the accompanying drawings, embodiments according to the present invention will be described hereinbelow. The specific configurations described below are provided by way of example only. The present invention covers variations which can be obtained by modifying the specific configurations.

First Embodiment

The game to which an embodiment of the present invention relates is a finger dance game (finger operation game). The finger dance game is a clearance-type timing operation game.

Figure 1:
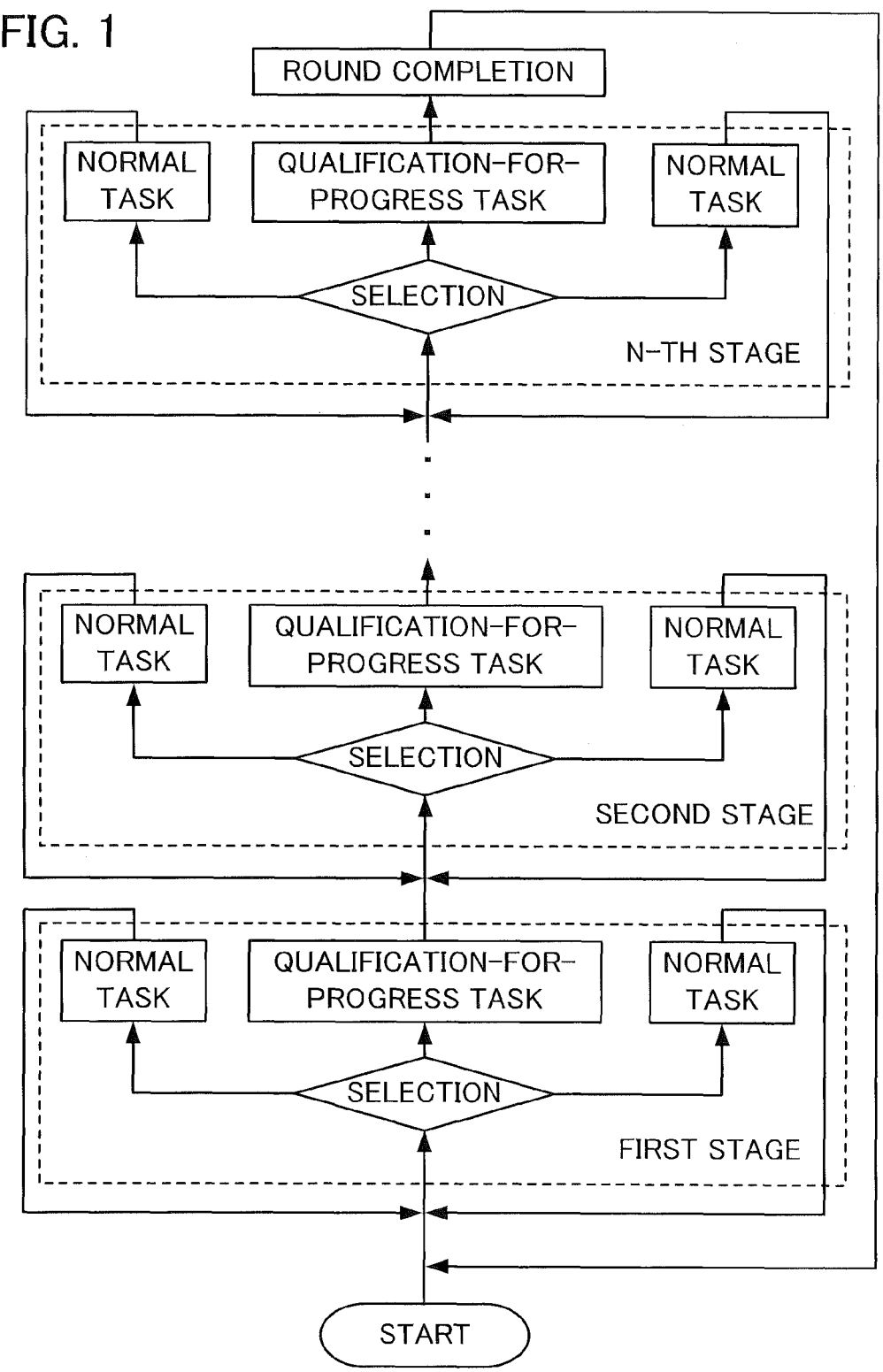
FIG. 1 is a schematic view showing a process of a game according to an embodiment of the present invention.

As illustrated in FIG. 1, in this game, multiple stages to be completed are prepared. Each stage includes multiple tasks (unit games). In each stage, the player selects any one task of the stage and plays the selected task. Each task is completed when the result shows that a requirement for completion assigned to the task is satisfied.

The tasks of each stage are classified into a qualification-for-progress task or a normal task. When the player completes the qualification-for-progress task, the player can play a task of the other stage. Except for the first stage just after starting the game (the first stage of FIG. 1), the player can play a task of a certain stage if the player completes the qualification-for-progress task of the stage just before the certain stage. If the qualification-for-progress task of the final stage (the nth stage of FIG. 1) is completed, then one round of the game is completed. After that, the player can select any one task of the first stage. In this way, the player can repeatedly play the game from a task of the first stage to the completion of the entire round of the game.

When the player completes a normal task, the player can select any one of the tasks of the stage to which the completed normal task belongs. That is, when the player completes a normal task, the player can play a task of the same stage; however, the player cannot proceed to the next stage. Since each stage has the qualification-for-progress task and the normal task, if completing the qualification-for-progress task is difficult and completing the normal task is easy, the player can try the qualification-for-progress task after improving the player's skill by playing the normal task repeatedly. On the other hand, if completing the qualification-for-progress task is easy and completing the normal task is difficult, the player can skip the normal task and play the qualification-for-progress task to proceed to the next stage.

Although not shown, if the player fails to complete any one of the tasks, the process returns to the first stage and the player can start the game again from the selection of any one of the tasks of the first stage.

One of multiple standard finger operations is assigned to each task. The higher is the conformity to the standard finger operation assigned to the task for the playing period, the better the result of the task becomes.

A requirement for completion of each task is defined using parameters such as a miss count limit or a score. For example, the requirement for completion is that the number of misses be less than three, that the score be not less than 100 points, or that the number of misses be less than three and the score be not less than 100 points. As just described, in this embodiment, the requirement for completion includes at least one of the miss count limit or the score. The requirement for completion may be defined in other ways, for example: the player could continue to play to the end of the task; a parameter which varies in accordance with the conformity to the player's operation was not less than a predetermined value at the end of the task; the number of combination bonuses (to conform manipulations sequentially) which the player acquired was not less than a predetermined value; and the number of conformed manipulations in the task was not less than a predetermined value.

Each standard finger operation presented to the player in each task has a defined level of difficulty in play. For instance, the level of difficulty in play in a certain task is different from the level of difficulty in play in another task that has the same operation sequence (order of the operation) but has a different tempo from the tempo of the certain task. Thus, a "content of play" which is defined by the tempo (level of difficulty in play) and the operation sequence is assigned to each task.

The level of difficulty for completion of each task is determined by the above-described "requirement for completion" and the above-described "level of difficulty in play". In other words, the "level of difficulty for completion" includes both the "requirement for completion" and the "level of difficulty in play". Accordingly, the stricter the requirement for completion, the higher is the level of difficulty for completion. In addition, the higher the level of difficulty of the standard finger operation (the level of difficulty in play), the higher the level of difficulty for completion.

Basically, the game is designed so that the player can play a task that has a higher level of difficulty for completion after completing a qualification-for-progress task. The player returns to the first stage in which the level of difficulty in play is easiest when the player completes the qualification-for-progress task of the nth stage. However, the present invention is not limited to such an embodiment. The level of difficulty for completion may be designed independently of the order of the stages.

Figure 1A:
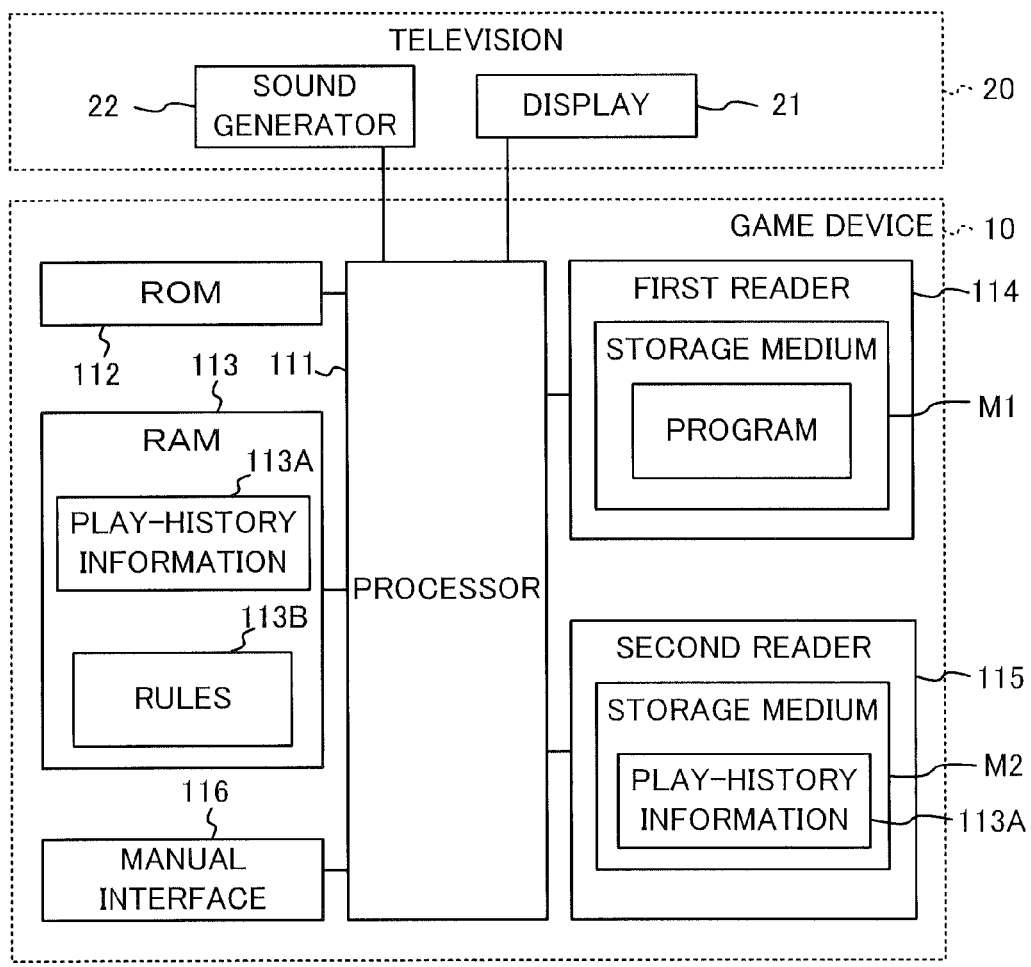
FIG. 1A is a block diagram showing a structure of a game device according to an embodiment of the present invention.

FIG. 1A illustrates a block diagram showing a structure of game device 10 according to the embodiment of the present invention. Game device 10 is a home video game machine and a game device for the finger dance game. Game device 10 can be connected to home television 20. Television 20 includes display 21 and sound generator 22. When game device provides image data to television 20, display 21 displays images which the image data presents. Sound generator 22 includes a speaker. When game device 10 provides sound data to television 20, sound generator 22 makes the speaker output the sound which the sound data presents. In an alternative embodiment, display 21 and sound generator 22 may be separated, or any other information notifier may be used in place of display 21 and sound generator 22. In another alternative embodiment, game device 10 may include display 21 and sound generator 22.

Game device 10 is a computer and includes processor 111, ROM (read only memory) 112, RAM (random access memory) 113, first reader 114, second reader 115, and manual interface 116. Manual interface 116 includes four manual operation buttons which are manipulated by the fingers of the player. Manual interface 116 generates data based on the manipulation of these manual operation buttons and provides the generated data to processor 111.

In another embodiment, manual interface 116 may include five or more manual operation buttons. Manual interface 116 may have step panels that are stomped on by the player of a dance game in place of the manual operation buttons. Manual interface 116 may have the manual operation buttons and the step panels so that the player can select the finger dance game (finger operation game) mode or the dance game mode. Both the finger dance game mode and the dance game mode may be played simultaneously by two players.

First reader 114 is, e.g., a DVD-ROM drive. Processor 111 can read information stored in a storage medium (e.g., DVD-ROM) M1 that is set in first reader 114. Storage medium M1 stores a computer program of the finger dance game.

Second reader 115 is, e.g., a memory card reader-writer. Processor 111 can read information stored in storage medium (e.g., nonvolatile memory card) M2 which is set in second reader 115 and can store information in the storage medium M2. Storage medium M2 is used for storing play-history information 113A. Play-history information 113A is information that represents a history of plays. Play-history information 113A is loaded into RAM 113.

Figure 2:
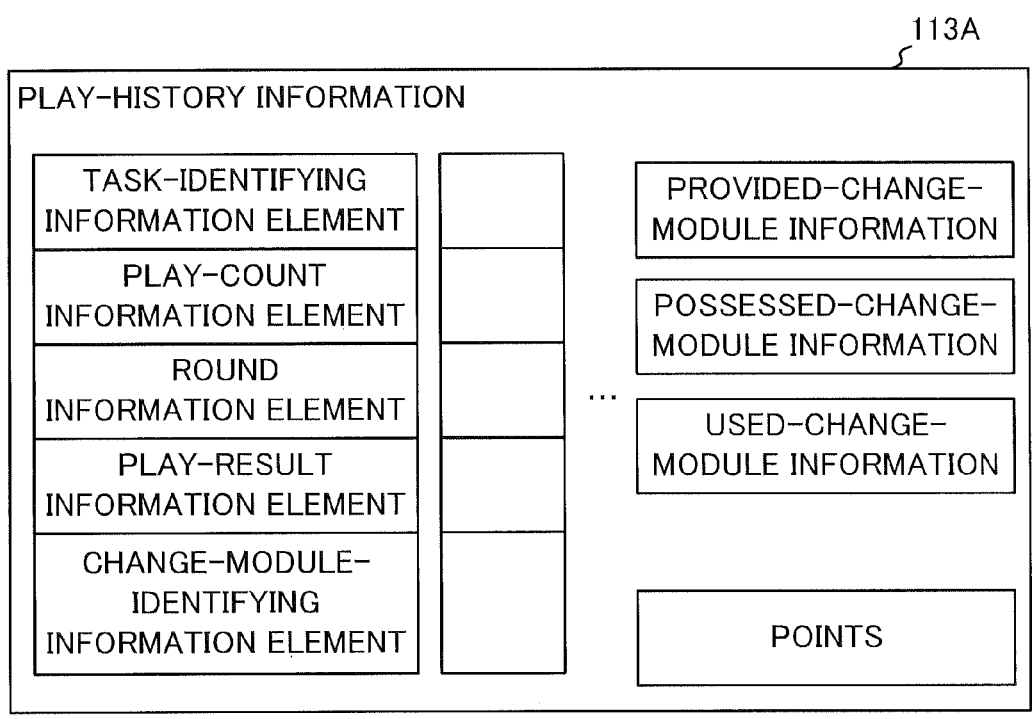
FIG. 2 is a conceptual diagram showing a content of play-history information processed by a game device according to an embodiment of the present invention.

FIG. 2 is a conceptual diagram that represents a content of play-history information 113A. As illustrated in FIG. 2, play-history information 113A includes a task-identifying information element on each play of the task, a play-count information element, a round information element, a play-result information element, and a change-module-identifying information element. These information elements are associated with a corresponding play. The task-identifying information element identifies the task played. The play count information element represents how many times the player using storage medium M2 has played the task (more precisely, represents the number of plays including the play which the player using storage medium M2 plays). The round information element represents the number of rounds for the game device in which the play is included. The play result information element represents the result of the play (e.g., score, miss count, completion or failure of the play). The change-module-identifying information element identifies the change module used in the play.

The player can change rules on the computer game, especially, rules (specifically, parameters) that stipulate the levels of difficulty for completion of several tasks. For instance, the player can change the requirement for completion of a certain task to be higher or lower. The player also can indicate the extent of the change of the requirement for completion. The player also can change the level of difficulty in play in each task to be higher or lower.

The computer program of the game prepares multiple change modules that correspond to respective multiple change effects on several tasks. Each change module is a program element which describes a change effect for a rule of the game and which changes the rule. To select a change module for use by the player is equivalent to selecting a change effect described in the change module for use. The change module exists virtually, and is represented as data for processing (including execution in the computer program) by the processor. The player recognizes the change module through an image displayed by display 21.

When a change module is provided to the player on the task in which the change module is available, the provided change module is presented to the player as an available change module candidate before the play of the task. If the player selects the change module, the change module is purchased by the player, and the player possesses the change module. To "provide" the change module means to assign the change module that is prepared for the task to the player. When the player completes the task, the change module prepared for the task is assigned to the player from the computer program and is described as the presentable change module (provided change module) in provided-change-module information. That is, the provided-change-module information represents the change module which can be presented to the player. The provided-change-module information is described in play-history information 113A and is stored in RAM 113 and storage medium M2. To "present" the change module means to provide notification that the change module is available in the task in order to encourage the player to purchase the change module. More specifically, to "present" the change module means to display on display 21 instructions for purchase of the change module described in the provided-change-module information of play-history information 113A stored in RAM 113.

To "purchase" the change module means to pay the price of the change module by points to possess the change module. The points exist virtually, and they are represented as data for processing by the processor. The points are earned and increase whenever the player plays the game. The points are described in play-history information 113A and are stored in RAM 113 and storage medium M2.

To "possess" the change module means to keep the change module available by the player as a result of purchase. More specifically, to "possess" the change module means that the change module is described in possessed-change-module information of play-history information 113A stored in RAM 113. That is, the possessed-change-module information represents the change module which is possessed by the player. The possessed-change-module information is described in play-history information 113A and is stored in RAM 113 and storage medium M2. As a result of purchase of the change module by the player, the change module which is newly described in the possessed-change-module information is excluded from the provided-change-module information.

To "use" the change module means to change a rule of the finger dance game so that the change effect described in the change module is activated. The player can use at most four change modules simultaneously. used-change-module information represents the change module which is in use. The used-change-module information is described in play-history information 113A and is stored in RAM 113 and storage medium M2. That is, RAM 113 and storage medium M2 are change module storage units which store the change module which is selected to be used by the player as the change module in use.

Play-history information 113A stored in storage medium M2 is loaded into RAM 113. Play-history information 113A stored in RAM 113 is updated after each play of a task and is copied into storage medium M2. That is, play-history information 113A stored in RAM 113 and play-history information 113A stored in storage medium M2 are similarly updated after each play of a task.

The computer program stored in storage medium M1 is loaded into RAM 113. That is, RAM 113 is a rule storage unit which stores rules 113B of the finger dance game temporarily. Rules 113B include a rule stipulating the requirement for completion of each task and a rule stipulating the content of the play of each task (the operation sequence and the level of difficulty in play). The rule stipulating the requirement for completion and the rule stipulating the level of difficulty in play among rules 113B are subjected to be changed by use of the change module. The play of the game is executed in accordance with the rule stipulating the content of the play among rules 113B.

An IPL (Initial Program Loader) and an operating system are stored in ROM 112. Upon application of power (not shown), processor 111 reads the IPL from ROM 112 and executes the IPL. Processor 111 reads and executes the operating system by executing the IPL. Processor 111 reads and executes the computer program of the finger dance game for storage medium M1 set in first reader 114. Processor 111 executes the game process (as will hereinafter be described in detail) by executing the computer program of the finger dance game. The player can play the finger dance game in the game process. Processor 111 provides image data to display 21 and provides sound data to sound generator 22 in the play.

Figure 3:
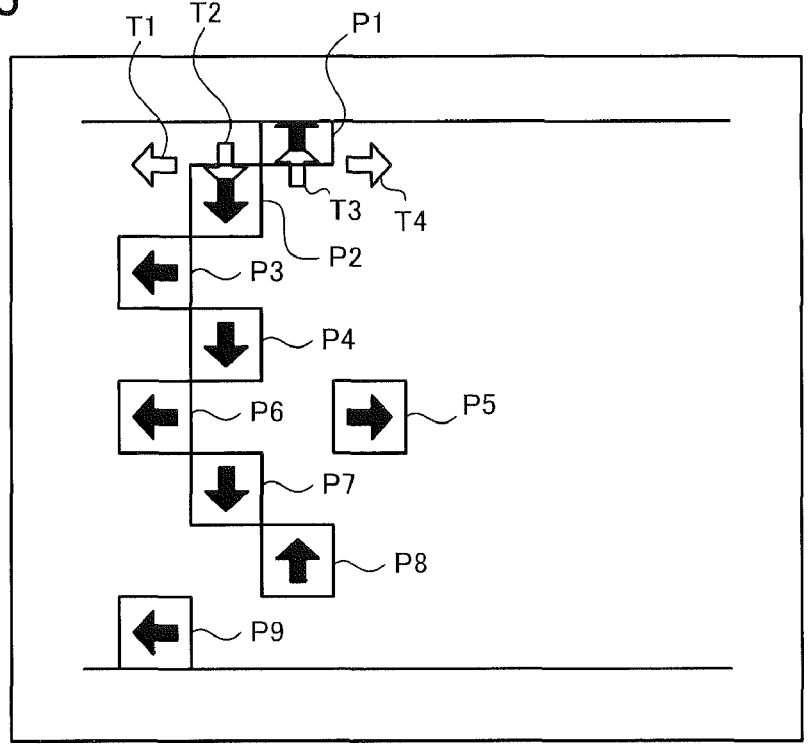
FIG. 3 illustrates an example of an image displayed in a display connected to a game device according to an embodiment of the present invention.
Figure 4:
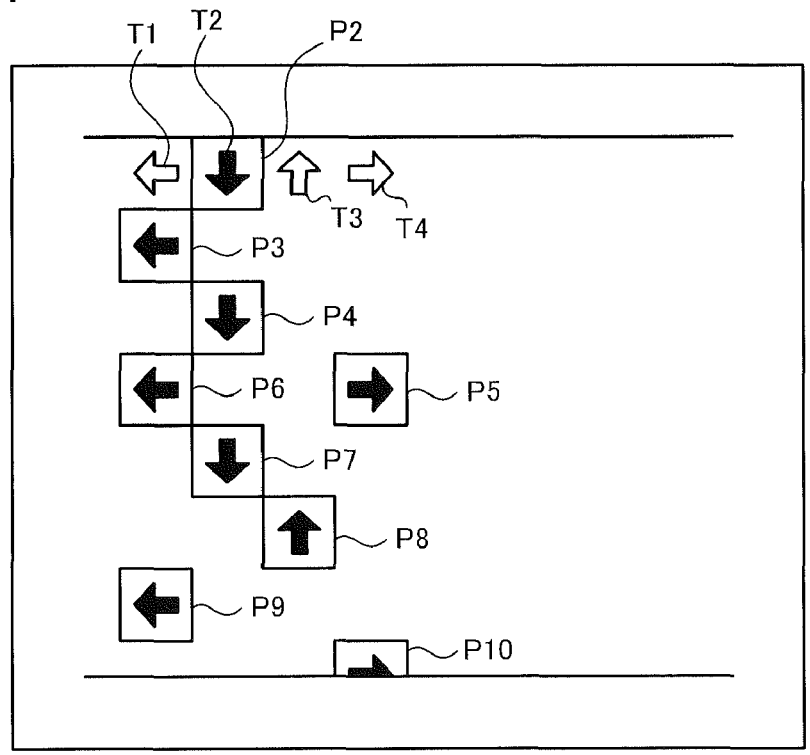
FIG. 4 illustrates another example of an image displayed in a display connected to a game device according to an embodiment of the present invention.

FIGS. 3 and 4 illustrate examples of images displayed in display 21. These images are displayed in a single play of the finger dance game. The image of FIG. 4 is displayed after displaying the image of FIG. 3. As clearly shown in these figures, in the single play of the finger dance game, button indication marks P1, P2, ..., which travel from the bottom to the top of the image, and operation timing indication marks T1 to T4, which are fixed in the transverse direction on the top of the image are displayed.

Operation timing indication marks T1 to T4 correspond to the four manual operation buttons of manual interface 116. For instance, operation timing indication mark T1 represents a time point at which the first manual operation button should be pushed. Button indication marks P1, P2, . . . , correspond to manipulations to be performed by the player. For instance, button indication mark P1 in FIG. 3 represents that the manual operation button to be pushed is the third manual operation button. Each button indication mark overlaps the operation timing indication mark corresponding to the manual operation button on the top of the image at the time point at which the manual operation button indicated by the button indication mark should be pushed. In the play of the finger dance game, the player must push the indicated manual operation button on the indicated time point while watching the image. If the manipulation by the player is missed, the miss count increases. If the manipulation by the player is successful, the score increases.

Figure 5B:
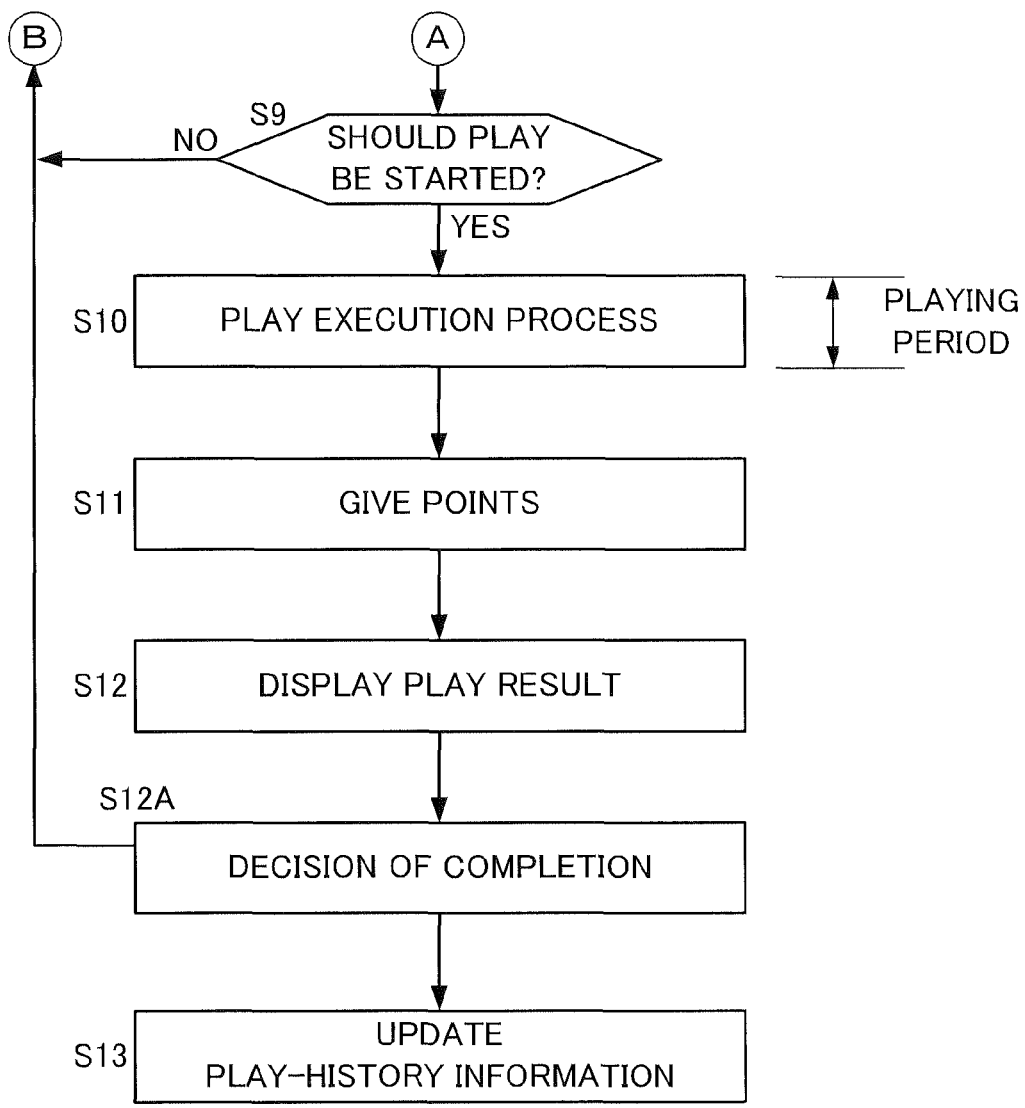
FIG. 5B is the other part of a flow chart showing the game process.

FIGS. 5A and 5B constitute a flow chart showing the game process which processor 111 of game device 10 executes in accordance with the computer program. In the game process, processor 111 decides whether or not there is play-history information 113A to be loaded (step S1). The decision result is NO when storage medium M2 has not been set in second reader 115 or when storage medium M2 set in second reader 115 has not stored play-history information 113A; otherwise, the decision result is YES.

When the decision result of step S1 is YES, processor 111 loads play-history information 113A (step S2). More specifically, processor 111 reads play-history information 113A from storage medium M2 and stores the play-history information into RAM 113. Subsequently, the process proceeds to step S2A. When the decision result of step S1 is NO, processor 111 executes initialization (step S3). More specifically, processor 111 stores play-history information 113A which represents that all of the tasks have not been completed, that no change module has been possessed, and that there has not been any used change module into RAM 113. Subsequently, the process proceeds to step S2A.

In step S2A, processor 111 specifies the stage being played. The first stage (FIG. 1) is specified directly after starting the game process. The first stage is specified after failing to complete any task. The first stage is also specified after completion of the qualification-for-progress task of the final stage, that is, directly after completion of one round. Directly after completion of the qualification-for-progress task of any one of the first stage to the (n−1)th stage, the next stage is specified. Directly after completion of any one of the normal tasks, the stage to which the completed normal task belongs is specified.

Figure 6:
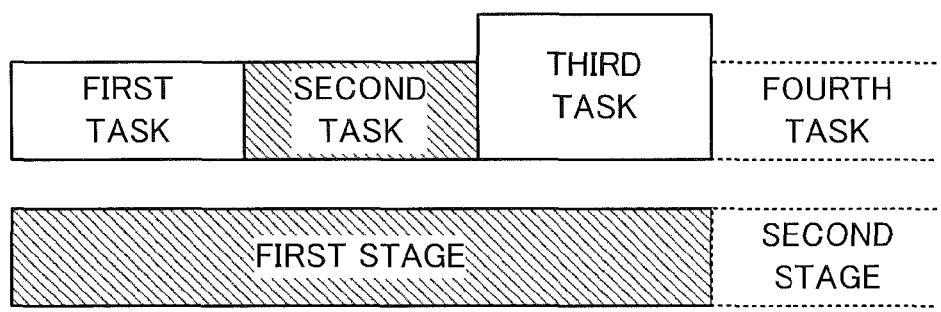
FIG. 6 exemplifies a task selection according to an embodiment of the present invention.

Next, processor 111 executes a task selection process (unit game selection process) prompting the player to select a single task from the tasks of the specified stage (step S4). More specifically, as illustrated in FIG. 6, processor 111 causes display 21 to show an image showing selectable tasks based on play-history information 113A stored in RAM 113, and encourages the player to select a task that the player will play. In the example of FIG. 6, the selectable tasks are the first task to the third task in the first stage, and the first stage and the second task are selected. The third task is the qualification-for-progress task that should be completed in order that the player may proceed from the first stage to the second stage. The task selection process finishes when a selection signal representing a determinately selected task is supplied to processor 111 from manual interface 116 as a result of the player having determinately selected a task.

Next, processor 111 decides whether or not a change module is prepared for the task selected to be played (step S4A). As described above, the change module is not prepared for all of the tasks, but for several tasks. When no change module is originally prepared for the selected task, the process proceeds to step S9. On the other hand, when the change module is originally prepared for the selected task, the process proceeds to step S4B.

In step S4B, processor 111 decides whether or not there is a purchasable change module for the task selected to be played. More specifically, processor 111 decides whether or not the provided-change-module information (FIG. 2) for the task has been stored in RAM 113. As described above, the provided change module is given to the player as a reward of completion of the task and is described in the provided-change-module information. Thus, the decision of step S4B is NO just after starting the game. As described above, the change module, which is described in the possessed-change-module information as a result of purchase by the player, is excluded from the provided-change-module information. Therefore, only purchasable change modules are described in the provided-change-module information. If the decision result of step S4B is NO, the process proceeds to step S9. On the other hand, the decision result of step S4B is YES, the process proceeds to step S5.

In step S5, processor 111 decides whether or not a change-module-purchase process should be executed. The decision result is YES when an operation signal instructing to execute the change-module-purchase process has been supplied from manual interface 116. When the decision result is YES, processor 111 executes the change-module-purchase process (step S6).

Figure 7:
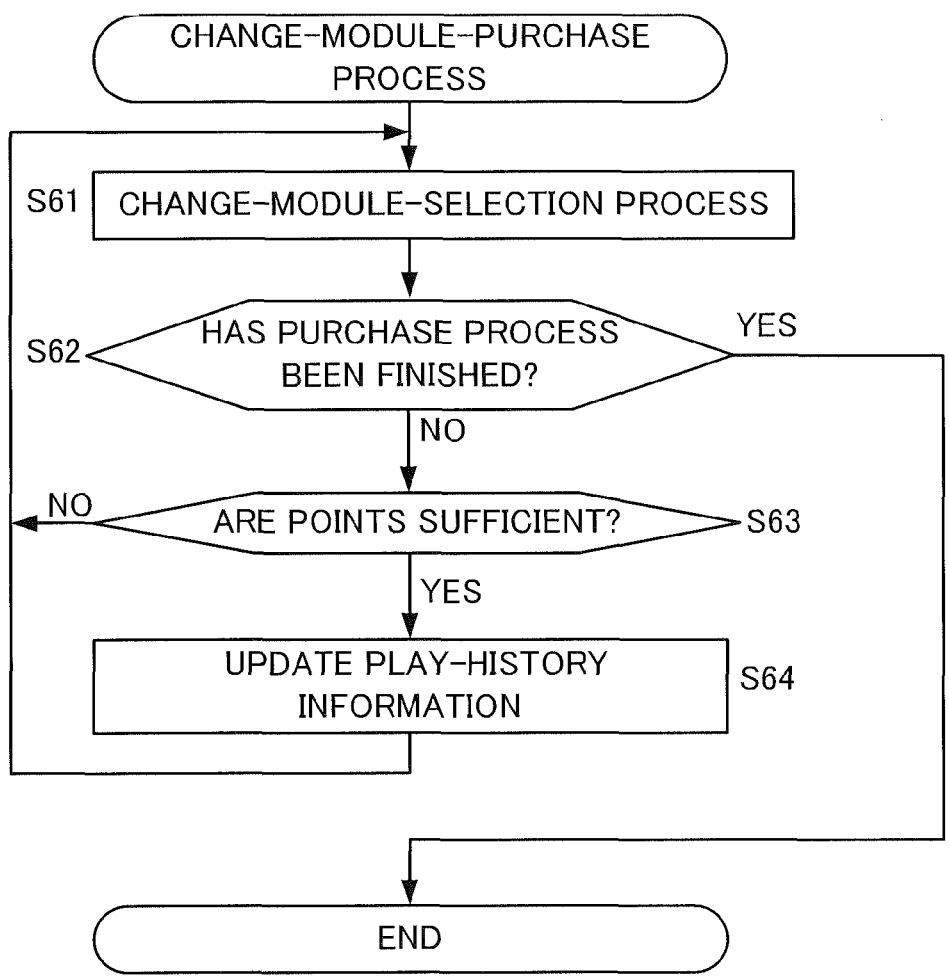
FIG. 7 is a flow chart showing a purchase process executed by a processor.

FIG. 7 is a flow chart illustrating a flow of the change-module-purchase process. At the beginning of the change-module-purchase process, processor 111 executes a change-module-selection process (step S61). More specifically, processor 111 causes display 21 to show images representing at least one provided change module based on the provided-change-module information (FIG. 2) of play-history information 113A stored in RAM 113 and encourages the player to select a single change module. The change-module-selection process finishes when a signal representing the selected change module is supplied to processor 111 from manual interface 116 resulting from the player's selection of the single change module. Alternatively, the change-module-selection process finishes when a signal instructing to finish the change-module-purchase process is supplied from manual interface 116 to processor 111 resulting from the player's decision to finish the change-module-purchase process.

After the change-module-selection process, processor 111 decides whether or not the change-module-purchase process has been finished (step S62). The decision result is YES when the signal instructing to finish the change-module-purchase process has been supplied from manual interface 116. In this case, processor 111 finishes the change-module-purchase process. On the other hand, when the decision result of step S62 is NO, processor 111 decides whether or not the points are sufficient for the selected change module (step S63). The decision result is YES when the player has the points (FIG. 2) which exceed the price of the selected change module.

When the decision result of step S63 is YES, processor 111 updates play-history information 113A so as to represent the selected change module (step S64). Specifically, the description with respect to the selected change module is excluded from the provided-change-module information and is included to the possessed-change-module information. As a result, the player comes to possess the selected change module. In step S64, the number of points which the player has is decreased by the amount corresponding to the price of the selected change module. Afterward, the process returns to step S61, and the player is able to purchase a further provided change module.

When the decision result of step S63 is NO, the process returns to step S61, and the player is able to select a provided change module again. That is, the purchase of the change module which the player tried to purchase is refused.

When the change-module-purchase process is completed, or when the decision result of step S5 is NO, processor 111 decides whether or not use and nonuse of change modules should be set (step S7 of FIG. 5A). The decision result is YES when a signal instructing to set use and nonuse of change modules has been supplied from manual interface 116 resulting from the player's decision to instruct use and nonuse of change modules. When the decision result of step S7 is YES, processor 111 executes a use-and-nonuse setting process of a change module (step S8).

Figure 8:
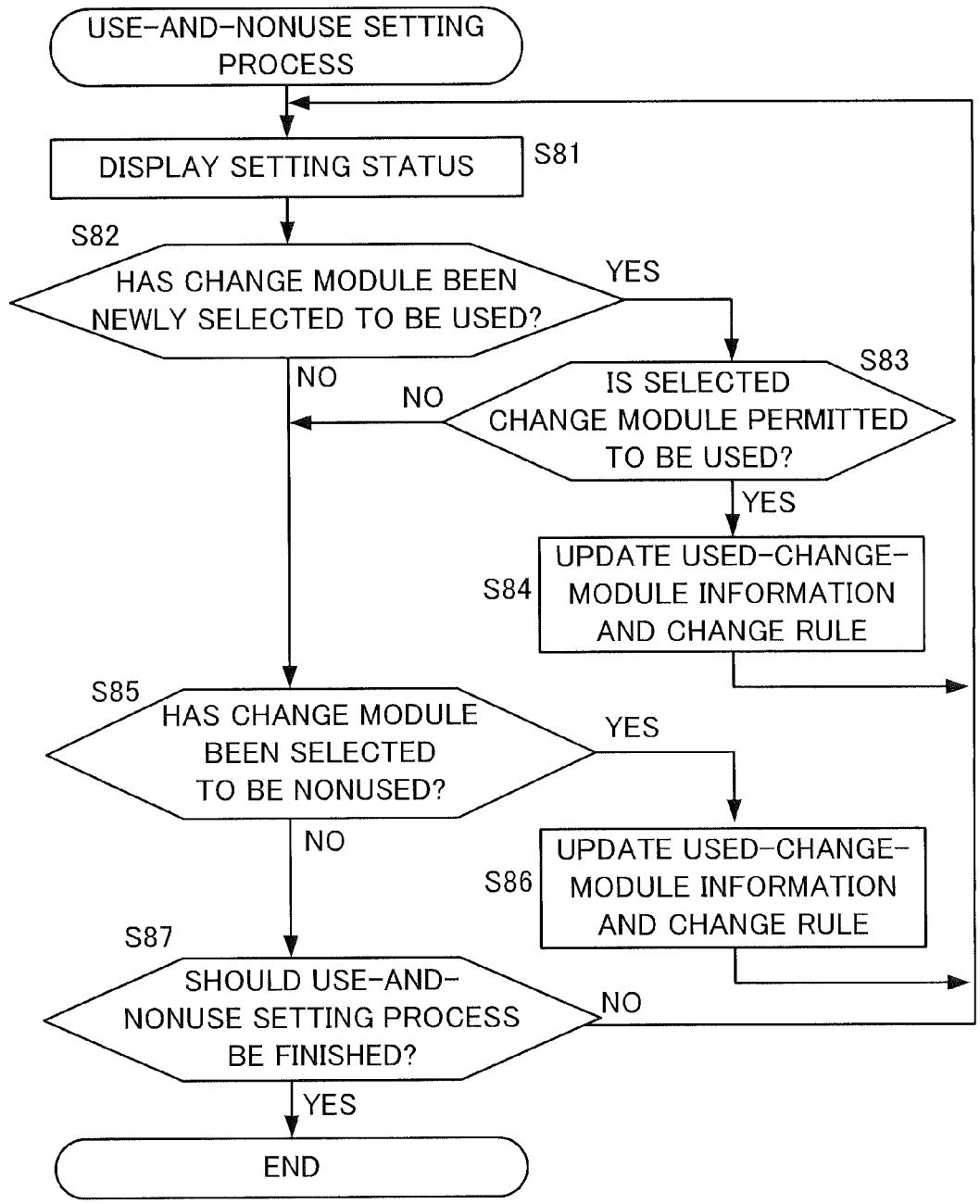
FIG. 8 is a flow chart showing a use-and-nonuse setting process executed by a processor.

FIG. 8 illustrates a flow of the use-and-nonuse setting process of a change module. In the use-and-nonuse setting process of a change module, processor 111 causes display 21 to show a setting status (step S81). Specifically, processor 111 causes display 21 to show the basic level of difficulty for completion (level of difficulty for completion designed in the computer program) of the selected task to be played. Processor 111 also causes display 21 to show an image, which represents a use-and-nonuse setting status of each possessed change module for the task selected to be played and a change effect on the level of difficulty for completion if the change module possessed by the player is used, based on the possessed-change-module information and the used-change-module information in play-history information 113A stored in RAM 113. The change effect is a necessary score or a necessary miss count limit to complete the task or an applied level of difficulty in play (tempo) for the task, when the change module relevant to the change effect is used. FIG. 9 illustrates an example of the image displayed in display 21 at step S81.

Thus, processor 111 works as a notifier which outputs a signal notifying candidates for a change module to change the level of difficulty for completion of the task to display 21 for informing the player of the candidates. The notified candidates for a change module include a change module for lowering the level of difficulty for completion and a change module for raising the level of difficulty for completion. Processor 111 also works as a used change module notifier which outputs a signal notifying used change modules described in the used change module of play-history information 113A stored in RAM 113 (change module storage unit) for informing the player of the used change modules.

Next, processor 111 decides whether or not a change module has been newly selected to be used (step S82 of FIG. 8). The decision result is YES when a signal instructing to use a new change module has been supplied from manual interface 116 to processor 111 resulting from the player's additional selection to use a new change module.

When the decision result of step S82 is YES, processor 111 decides whether or not the newly selected change module for the player's use is permitted to be used (step S83). That is, processor 111 decides whether or not a permissible range of use of change modules will be exceeded if the newly selected change module is used. The permissible range of use is a threshold which represents a boundary of use of change modules, e.g., 4. A number is assigned to each change module (1 and 2 of FIG. 9). Some change modules have "1" as the number and other change modules have "2" or more as the number. In step S83, processor 111 works as a change-module-use permitter and enables the player to use the newly selected change module when a sum of the number assigned to a change module already used by the player and described in the used-change-module information in play-history information 113A stored in RAM 113 (change module storage unit) and the number assigned to the change module newly selected to be used by the player is equal to or less than the permissible range of use (threshold). For instance, the decision result of step S83 is NO when the remaining number of the permissible range of use is 1 and the number of the newly selected change module is 2.

When the decision result of step S83 is YES, processor 111 updates the used-change-module information of play-history information 113A stored in RAM 113 so as to represent the change module newly selected to be used, and rewrites the rule corresponding to the change module among rules 113B stored in RAM 113 so as to activate the change effect described in the newly used change module (step S84). If the change module has a change effect to change the requirement for completion of a task, in step S84, processor 111 changes the rule stipulating the requirement for completion in accordance with the change module. If the change module has a change effect to change the level of difficulty in play (specifically, tempo) of a task, in step S84, processor 111 changes the rule stipulating the level of difficulty in play in accordance with the change module. Thus, processor 111 works as a difficulty changer which rewrites a rule stored in RAM 113 that is a rule storage unit. Afterward, the process returns to step S81.

When the decision result of step S82 or step S83 is NO, processor 111 decides whether or not a change module has been selected to be discontinued to be used ("NONUSED" in the Figures) (step S85). The decision result is YES when a signal representing a change module which comes to be unused has been supplied from manual interface 116 resulting from the player's instruction to discontinue use of the used change module. In this situation, processor 111 updates the used-change-module information of play-history information 113A stored in RAM 113 so as not to represent the designated change module. This change module remains described in the possessed-change-module information of play-history information 113A stored in RAM 113. As a result, RAM 113, which is a change module storage unit, stores the change module that has been used as a nonused change module. In addition, processor 111 (difficulty changer) rewrites the rule corresponding to the change module among rules 113B stored in RAM 113 so as to cancel the change in the level of difficulty for completion of the task corresponding to the change module (step S86). Afterward, the process returns to step S81.

When the decision result of step S85 is NO, processor 111 decides whether or not the use-and-nonuse setting process has been finished (step S87). The decision result is YES when a signal representing to finish the use-and-nonuse setting process has been supplied from manual interface 116 to processor 111 resulting from the player's decision to finish the use-and-nonuse setting process. In this instance, processor 111 finishes the use-and-nonuse setting process. If the decision result of step S87 is NO, the process returns to step S81.

After the end of the use-and-nonuse setting process, or when the decision result of step S7 is NO, processor 111 decides whether or not a play should be started (step S9 of FIG. 5B). The decision result is YES when a signal instructing to start a play has been supplied from manual interface 116 resulting from the player's decision to start the play. When the decision result of step S9 is NO, the process returns to step S2A. That is, processor 111 repeats steps S2A to S9 until the decision result of step S9 becomes YES.

When the decision result of step S9 is YES, processor 111 executes a play execution process that executes a play of the selected task (step S10). The play is executed in accordance with a rule stipulating a content of play (sequence and tempo) among rules 113B stored in RAM 113. In the play execution process, processor 111 evaluates the conformity of the player's manipulations to the standard dance assigned to the selected task for the playing period, and based on the evaluation, processor 111 enumerates a miss count and calculates a score. The enumeration and the calculation are performed in accordance with rules stored in RAM 113. For instance, if the rules have been changed to count two misses as a "one miss", two misses are counted as a "one miss".

Once the play execution process finishes, processer 111 gives points to the player (step S11). The given points are accumulated and stored in play-history information 113A of RAM 113. The amount of the given points is discretionary. For instance, the amount may be predetermined for each task, may be varied in response to a result of play, or may be a constant number. In another embodiment, points may be stored in RAM 113 when game device 10 reads, e.g., a card storing points, irrespective of the game.

Next, processor 111 works out the result of the play and causes display 21 to display the result on display 21 (step S12). The result of the play includes a miss count, a score, and so on. Then, processor 111 decides whether or not the task is completed based on the worked-out result of the play and rules stipulating the requirement for completion of the played task among rules 113B stored in RAM 113 (rule storage unit) (step S12A).

Furthermore, processor 111 updates play-history information 113A (FIG. 2) stored in RAM 113 based on the result of the play worked out at step S12 and the decision result of step S12A, and copies the updated play-history information 113A into storage medium M2 if storage medium M2 is set in second reader 115 (step S13). At the update at step S13, regarding this play of this task, the task-identifying information element, the play count information element, the round information element, the play result information element, and the change-module-identifying information element are added. In addition, at the update, a change module prepared for the task is provided when the selected task is completed. That is, if a change module is prepared for the task, the provided-change-module information is updated so as to represent the change module. However, the change module is not provided if a change module for raising the level of difficulty for completion of the task is prepared and if the play belongs to the first round in the game device. That is, the change module for raising the level of difficulty for completion is provided only when the player completes the task after completion at least one round in the game device. After step S13, the process returns to step S2A.

As explained above, according to game device 10 of the embodiment, since it is possible to change levels of difficulty for completion (at least one of a requirement for completion or a level of difficulty in play) of several unit games (tasks), it is possible to set a level of difficulty for completion of a task appropriately for the player without a large-scale experiment. Therefore, it is possible to reduce time and effort for designing the game so as to regulate an appropriate difference in levels of difficulty for completion between tasks belonging to two successive stages.

Since available candidates for a change module is notified to the player, the player can select a preferable change module for use among the notified candidates, and the level of difficulty for completion of the unit game is changed in accordance with the change module. The notified candidates may include change modules for lowering the level of difficulty for completion and for raising the level of difficulty for completion. Since the player can select one among multimodal options, both the player who finds it too difficult to complete the game and the player who finds it too easy to complete the unit game are satisfied.

Since processor 111 outputs to display 21 a signal for informing the player of a change effect caused by use of each candidate for the change module together with candidates for a change module, the player can know the effect caused by use of each candidate for the change module in advance.

When the player instructs to discontinue use of the used change module (i.e., when the decision at step S85 of FIG. 8 is YES), processor 111 makes RAM 113 store the used change module as a nonused change module, and rewrites the rule stored in RAM 113 so as to cancel the change of the level of difficulty for completion of the task corresponding to the change module. Thus, since the player is notified of the used change module, the player can select to discontinue use of the used change module.

Processor 111, which is the change-module-use permitter, can limit the number of the used change module by enabling the player to use the candidate for the change module when a sum of the number assigned to a change module already used by the player and the number assigned to the candidate newly selected to be used by the player is equal to or less than a threshold. It is necessary for the player to instruct to discontinue use of the already used change module in order to use another change module which the player wishes to use newly. As a result, the player can try to use various combinations of change modules.

According to game device 10, for instance, if a change module for raising the level of difficulty for completion is prepared for a task, the change module for raising the level of difficulty for completion is provided only when the player completes the task after completion of at least one round in the game device. That is, the change module is given when the player completes the task on the second round of the game. Thus, the game is unlikely to bore the player.

Second Embodiment

In the above-described first embodiment, when the player instructs to discontinue use of the used change module (i.e., when the decision at step S85 of FIG. 8 is YES), the change in the level of difficulty for completion of the task based on the change module is cancelled. However, as in the second embodiment, excepting the player's intention, another requirement may be set to discontinue use of the used change module.

Configurations of the computer game and the game device of the second embodiment are the same as those of the first embodiment. However, rules 113B stored in RAM 113, which is a rule storage unit, further include a rule stipulating a requirement to be achieved during play of the computer game in order to discontinue use of the change module already used by the player. The requirement may be, e.g., that there is no miss on a certain task or any tasks or achievement of a score more than a predetermined score on a certain task or any tasks.

Figure 10:
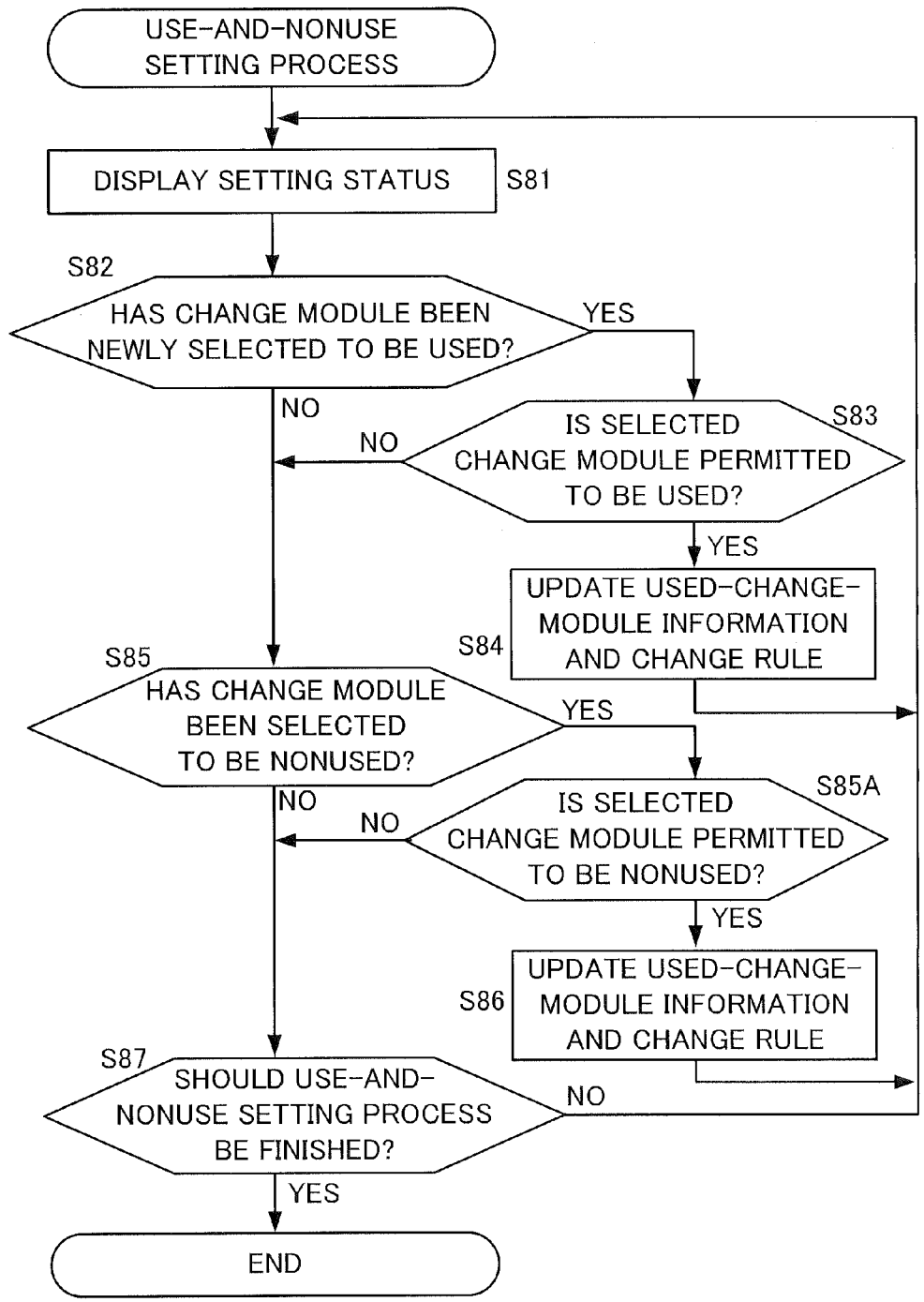
FIG. 10 is a flow chart showing a use-and-nonuse setting process executed by a processor in a second embodiment of the present invention.

The game process of the second embodiment is basically the same as that of the first embodiment. However, the use-and-nonuse selection process of change modules (step S8 of FIG. 5A and FIG. 8) of the first embodiment is different from that of the second embodiment. FIG. 10 illustrates a flow of the use-and-nonuse selection process of the second embodiment. Only steps of the second embodiment that are different from those of the first embodiment will be explained below with reference to FIG. 10.

When the decision of step S85 is YES, the process proceeds to step S85A in which processor 111 decides whether or not the change module which the player selects to discontinue to use is permitted to be discontinued to be used ("NONUSED" in the Figures). That is, processor 111 decides whether or not the above-described requirement to be achieved during play of the computer game in order to discontinue use of the change module is achieved. More specifically, processor 111 searches for play result information which describes a play result satisfying the requirement in play-history information 113A stored in RAM 113. If the play result information which describes the play result satisfying the requirement is found, the decision of step S85A is YES, and the process proceeds to step S86. Otherwise, the process proceeds to step S87.

Thus, when the requirement for discontinuing use of the change module, processor 111 updates the used-change-module information of play-history information 113A stored in RAM 113 so as not to represent the designated change module. This change module remains described in the possessed-change-module information of play-history information 113A stored in RAM 113. As a result, RAM 113 as a change module storage unit stores the used change module as a nonused change module. Thus, since the requirement excepting the player's intention is set to discontinue use of the used change module, the player's motivation of the game can be stimulated to satisfy the requirement.

In the above-described first and second embodiments, the cancellation of the used change module is triggered by the player's operation to set to discontinue use of the used change module. Thus, if the player does not decide to discontinue use of a change module, the change module is maintained being used.

However, in another embodiment, discontinuing use of the used change module is triggered by other events excepting the player's operation. For instance, with respect to a specific change module, if the requirement to be satisfied during play of the computer game in order to discontinue use of the change module is achieved, the change module may be cancelled automatically.

Third Embodiment

Figure 11:
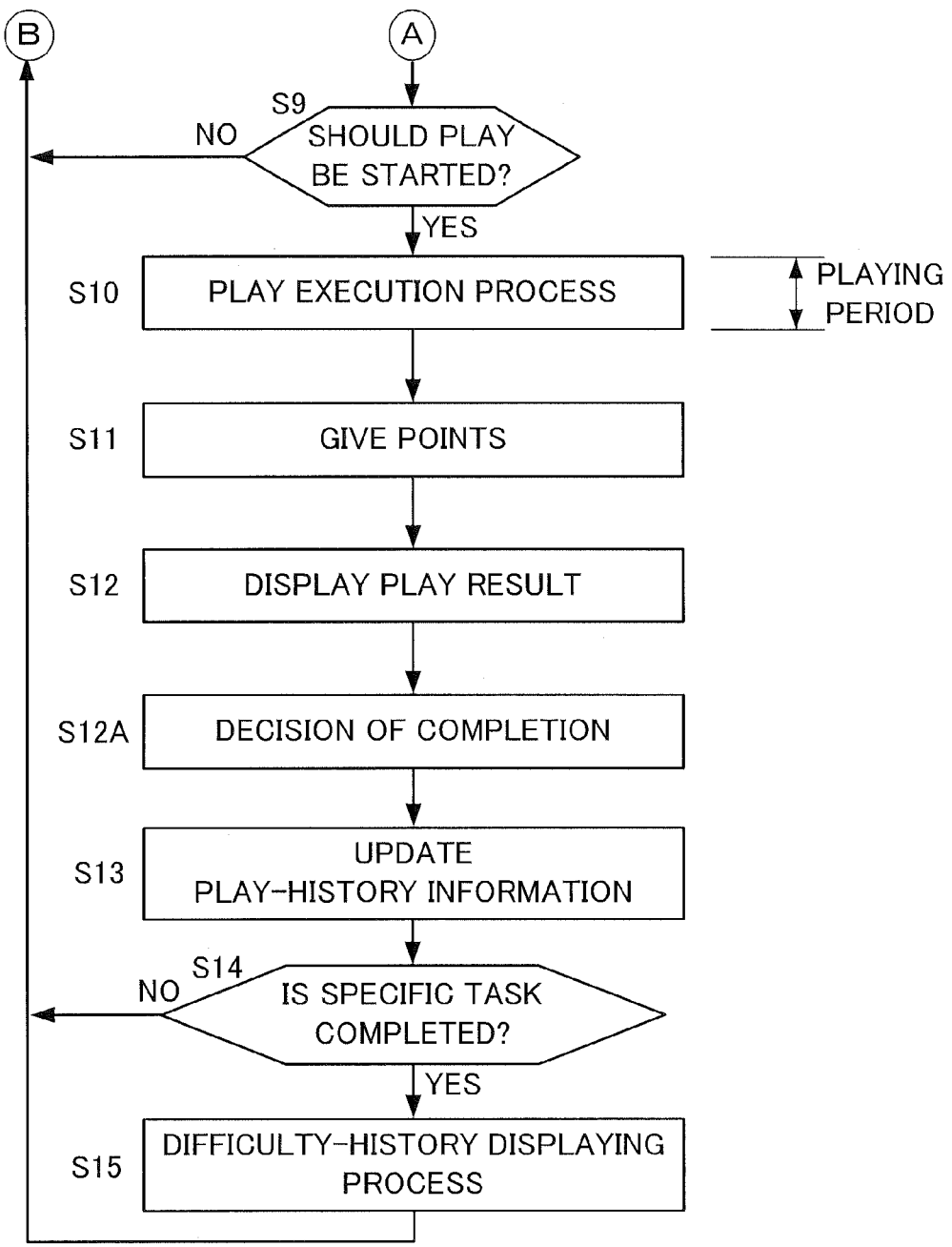
FIG. 11 is the other part of a flow chart showing a game process executed by a processor in a third embodiment.

FIG. 11 is a portion of a flow chart illustrating a game process executed by the processor of a game device of a third embodiment of the present invention. As is the case with FIG. 5B, FIG. 11 constitutes the flow chart together with FIG. 5A. Only steps of the third embodiment being different from those of the first embodiment will be explained below with reference to FIG. 11.

After step S13, the process proceeds to step S14 in which processor 111 decides whether or not the player has completed a specific task. That is, processor 111 decides whether or not the play execution step of the specific task was executed last and decides whether or not the player completed the task if the last play is a play of the specific task. If the decision of step S14 is NO, the process returns to step S2A (FIG. 5A). The "specific task" in this embodiment may be, e.g., the qualification-for-progress task of the last stage or another task.

If the decision of step S14 is YES, the process proceeds to step S15 in which processor 111 executes a difficulty-history displaying process. In this step, processor 111 works as a difficulty-history notifier for outputting in display 21 a signal for reporting information on the level of difficulty of completion of each of the plural tasks having been played by the player. As a result, display 21 displays an image illustrated in FIG. 12.

In FIG. 12, display 21 displays a play history that lists the name of each played task, the score, the miss count, the change module that was used, and the change effect resulting from using the change module. The change module that was used and the change effect resulting from using the change module are "information on the level of difficulty for completion". The information on the level of difficulty for completion may be only information that represents the change module that was used or only information that represents the change effect resulting from using the change module. Thus, since the player and people around the player can know the levels of difficulty in play of a series of tasks having been played by the player, the player and the people around the player can know the degree of skill of the player. After step S15, the process returns to step S2A (FIG. 5A).

Fourth Embodiment

Figure 13:
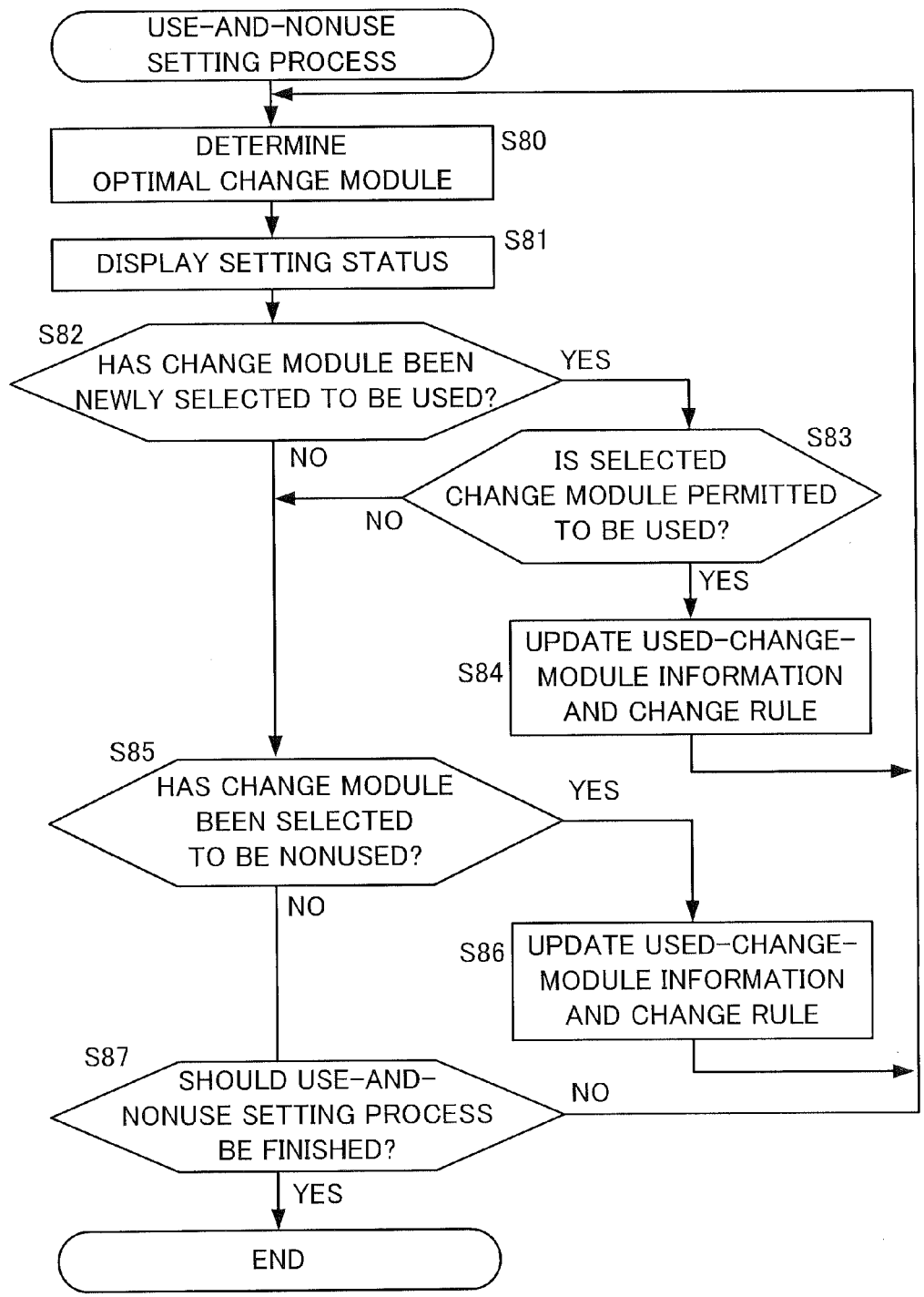
FIG. 13 is a flow chart showing a use-and-nonuse setting process executed by a processor in a fourth embodiment of the present invention.

FIG. 13 is a flow chart illustrating a flow of a use-and-nonuse setting process of a change module of a third embodiment of the present invention. Only steps of the third embodiment that are different from those of the first embodiment will be explained below with reference to FIG. 14.

At the beginning of the use-and-nonuse setting process of a change module in the fourth embodiment, processor 111 determines an optimal change module (step S80). In step S80, processor 111 works as an optimal-change-module determiner, refers to the plural change modules purchased by the player in the task selected by the player to be played and to information on the skill of the player with respect to play of the computer game, and determines from among the candidates a change module for changing the level of difficulty for completion of the task into the level estimated as optimal for the skill of the player.

For example, each change module is classified into a certain difficulty class based on the change effect. Processor 111 selects the change module which belongs to the lowest class among classes higher than the class of the skill of the player as an optimal change module for the player.

The information on the skill of the player with respect to play of the computer game is, e.g., play-history information 113A stored in RAM 113, especially play result information. For example, processor 111 may calculate a number corresponding to the skill of the player from the play result information. Alternatively, a score per category of manipulation (e.g., jump or long-press at manual interface 116) may be defined in advance with respect to each task, scores defined in the task completed (or failed) may be summed for each category, and the information on skill of the player may be generated based on the summed scores. Alternatively, the game device may ask the player and may generate the information on the skill of the player from the player's answer.

After step S80, processor 111 causes display 21 to show the setting status (step S81). FIG. 14 illustrates an example of an image displayed in display 21 at step S81 of the fourth embodiment. "AAAA" emphasized in FIG. 14 is the optimal change module estimated by processor 111. Thus, the change module estimated to be optimal for the skill of the player can be recommended to the player. In FIG. 14, although not only the optimal change module, but in addition, other change modules, are displayed, processor 111 may control display 21 to display only the optimal change module.

By modifying this embodiment, a change pattern that achieves the most effect if it is used in the selected task may be recommended to the player. The recommendation can be accomplished, e.g., based on the requirement for completion of the selected task and the available change modules.

Fifth Embodiment

Figure 15:
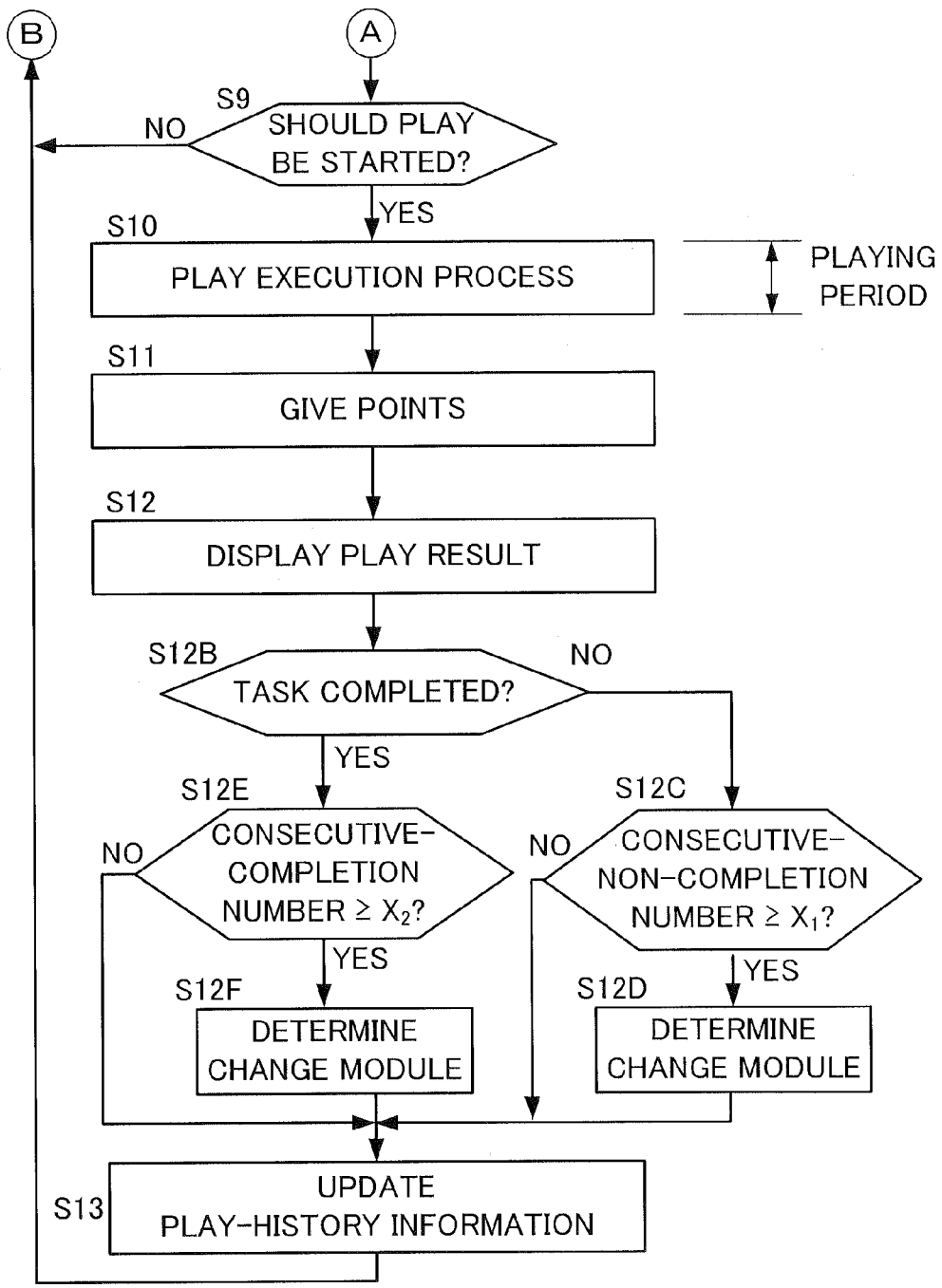
FIG. 15 is the other portion of a flow chart showing a game process executed by a processor in a fifth embodiment of the present invention.

FIG. 15 is a portion of a flow chart illustrating a game process executed by the processor of a game device of a fifth embodiment of the present invention. As is the case with FIG. 5B, FIG. 15 constitutes the flow chart together with FIG. 5A. Only steps of the fifth embodiment that are different from those of the first embodiment will be explained below, with reference to FIG. 15.

After step S12, the process proceeds to step S12B in which it is decided whether or not the task has been completed based on the result of the play and the rule stipulating the requirement for completion of the played task among rules 113B stored in RAM 113 (rule storage unit).

When the task has not been completed, the process proceeds to step S12C in which processor 111 works as a consecutive-non-completion number determiner for deciding the number of consecutive plays in which the player has been decided as not having completed the task (consecutive-non-completion number) based on play-history information 113A in RAM 113. Processor 111 also works as a comparer for comparing the consecutive-non-completion number with a first limit value $X_1$. When the consecutive-non-completion number is less than first limit value $X_1$, the process proceeds to step S13.

When the consecutive-non-completion number is greater than first limit value $X_1$, the process proceeds to step S12D in which processor 111 determines a change module lowering for the level of difficulty for completion of the task. That is, a candidate for a change module for lowering the level of difficulty for completion is assigned to a low-skill player. Afterwards, the process proceeds to step S13.

When the task has been completed, the process proceeds to step S12E in which processor 111 works as a consecutive-completion number determiner for deciding the number of consecutive plays in which the player has been decided to have completed the task (consecutive-completion number) based on play-history information 113A in RAM 113. Processor 111 also works as a comparer for comparing the consecutive-completion number with a second limit value $X_2$. When the consecutive-completion number is less than the second limit value $X_2$, the process proceeds to step S13.

When the consecutive-completion number is greater than the second limit value $X_2$, the process proceeds to step S12F and processor 111 determines a change module for raising the level of difficulty for completion of the task. That is, a candidate for a change module for raising the level of difficulty for completion is assigned to a high-skill player. Afterwards, the process proceeds to step S13. However, if a change module is not originally prepared for the played task, the process directly proceeds to step S13 after step S12B regardless of the decision of step S12B.

In step S13, play-history information 113A (FIG. 2) stored in RAM 113 is updated based on the result of the play worked out at step S12 and the decision result of step S12B, and the updated play-history information 113A is copied into storage medium M2 if storage medium M2 is set in second reader 115. At the update at step S13, regarding this play of this task, the task-identifying information element, the play count information element, the round information element, the play result information element, and the change-module-identifying information element are added. In addition, at the update, when the last step before S13 is step S12D or step S12F, the provided-change-module information is updated so as to represent the change module determined at step 12D or step 12F. However, the change module is not provided if a change module for raising the level of difficulty for completion of the task is prepared and if the play belongs to the first round in the game device. That is, the change module for raising the level of difficulty for completion is provided only when the player completes the task after completion at least one round in the game device. After step S13, the process returns to step S2A (FIG. 5A).

Thus, in step S81 of the use-and-nonuse setting process of a change module (step S8 of FIG. 5A and FIG. 8), processor 111 (the notifier) outputs a signal for informing the player of a candidate corresponding to the comparison to display 21. Once the candidate has been selected for use by the player (step S82), processor 111 (difficulty changer) rewrites a rule stored in RAM 113 so as to change the level of difficulty for completion of the task corresponding to the selected change module. Thus, a candidate appropriate for the skill of the player can be suggested to the player in accordance with past records regarding completion of tasks. In this case, if a notified candidate for a change module is preferable for the player, the player can select to use the change module, and the level of difficulty for completion of the task is changed corresponding to the change module.

If the player feels that a change module which has been used is not preferable, the player can cancel the change module at a use-and-nonuse setting process. In step S86 of the use-and-nonuse setting process, processor 111, that is, a difficulty restorer, rewrites a rule in RAM 113 so as to restore a level of difficulty for completion of a task. In another embodiment, for instance, restoration of a level of difficulty for completion may be triggered by specific operation by the player or other events so that steps for restoration of a level of difficulty by the player should be reduced. For instance, with respect to a specific change module, if the above-described requirement to be achieved during play of the computer game in order to discontinue use of the change module is satisfied, the change module may be cancelled automatically.

As in the second embodiment (FIG. 10), in the use-and-nonuse process of change modules in the fifth embodiment, it may be determined whether or not nonuse of a change module which the player selects to discontinue to use is permitted (step S85A of FIG. 10). That is, processor 111 may determine whether or not a requirement stored in RAM 113 to be achieved during play of the computer game in order to discontinue use of the change module is achieved. Once the requirement is satisfied, processor 111, that is, a difficulty restorer, rewrites a rule stipulating a level of difficulty for completion stored in RAM 113 so as to restore a level of difficulty for completion of a task. In this case, since the requirement excepting the player's intention is set to restore a level of difficulty for completion, the player's motivation of the game can be stimulated to satisfy the requirement.

Sixth Embodiment

Configurations of the computer game and the game device of a sixth embodiment are the same as those of the first embodiment. However, in this embodiment, a change module is not used as a result of the player having selected the change module to be used, but instead, a change module is automatically provided to the player corresponding to a record of play, and is used to change a level of difficulty for completion unless the player has instructed to discontinue use of the change module. As a result, the player does not purchase a change module using points, and provided change module candidates are not presented to the player for purchase.

Figure 16:
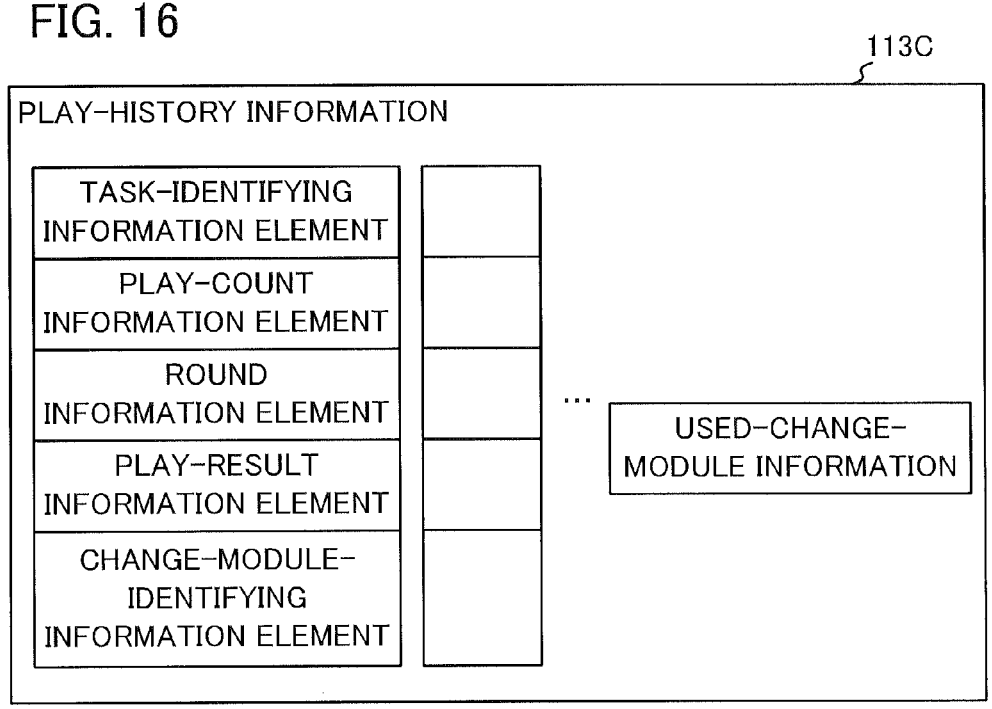
FIG. 16 is a conceptual diagram showing a content of play-history information processed by a game device according to a sixth embodiment of the present invention.

FIG. 16 is a conceptual diagram which represents a content of play-history information 113C processed in a game device according to the sixth embodiment. As is the first embodiment, the play-history information 113C is stored in RAM 113 and ROM 112. However, as described above, a change module is used directly after being provided to the player. That is, in this embodiment, a provided change module is not a change module that can be presented for the player to purchase, but is a used change module. Consequently, unlike play-history information 113A in FIG. 2, play-history information 113C does not have provided change module information and possessed change module information. There is no point to purchase a change module in play-history information 113C.

Figure 17A:
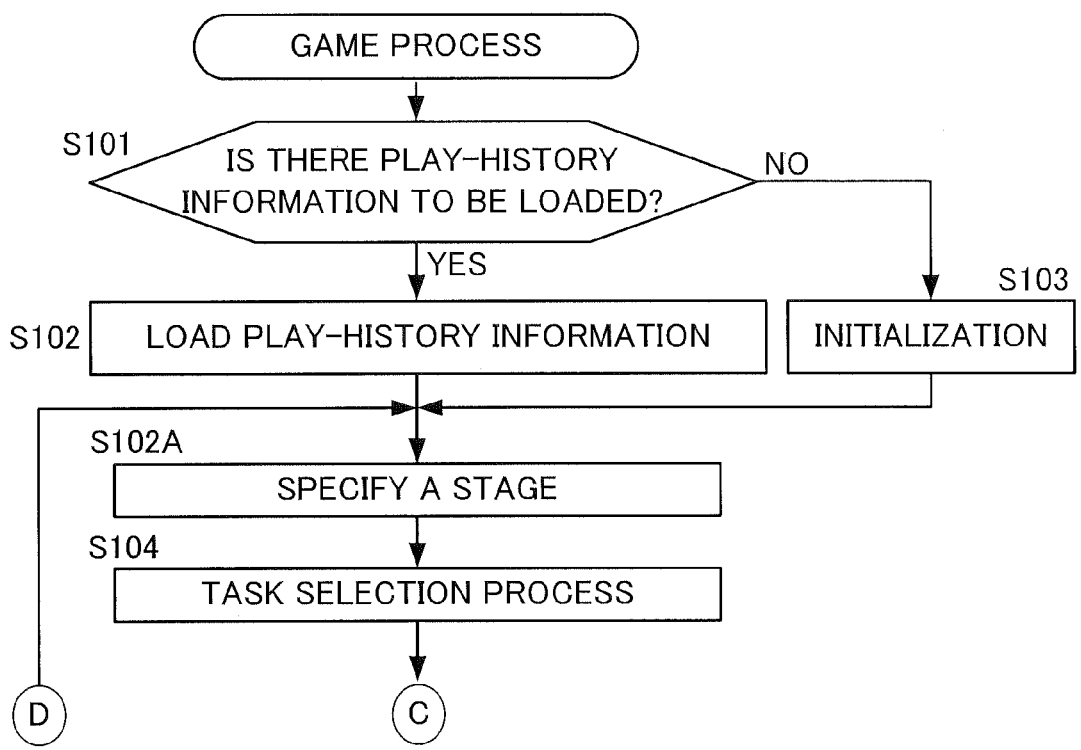
FIG. 17A is a portion of a flow chart showing a game process executed by a game device according to the sixth embodiment of the present invention.
Figure 17B:
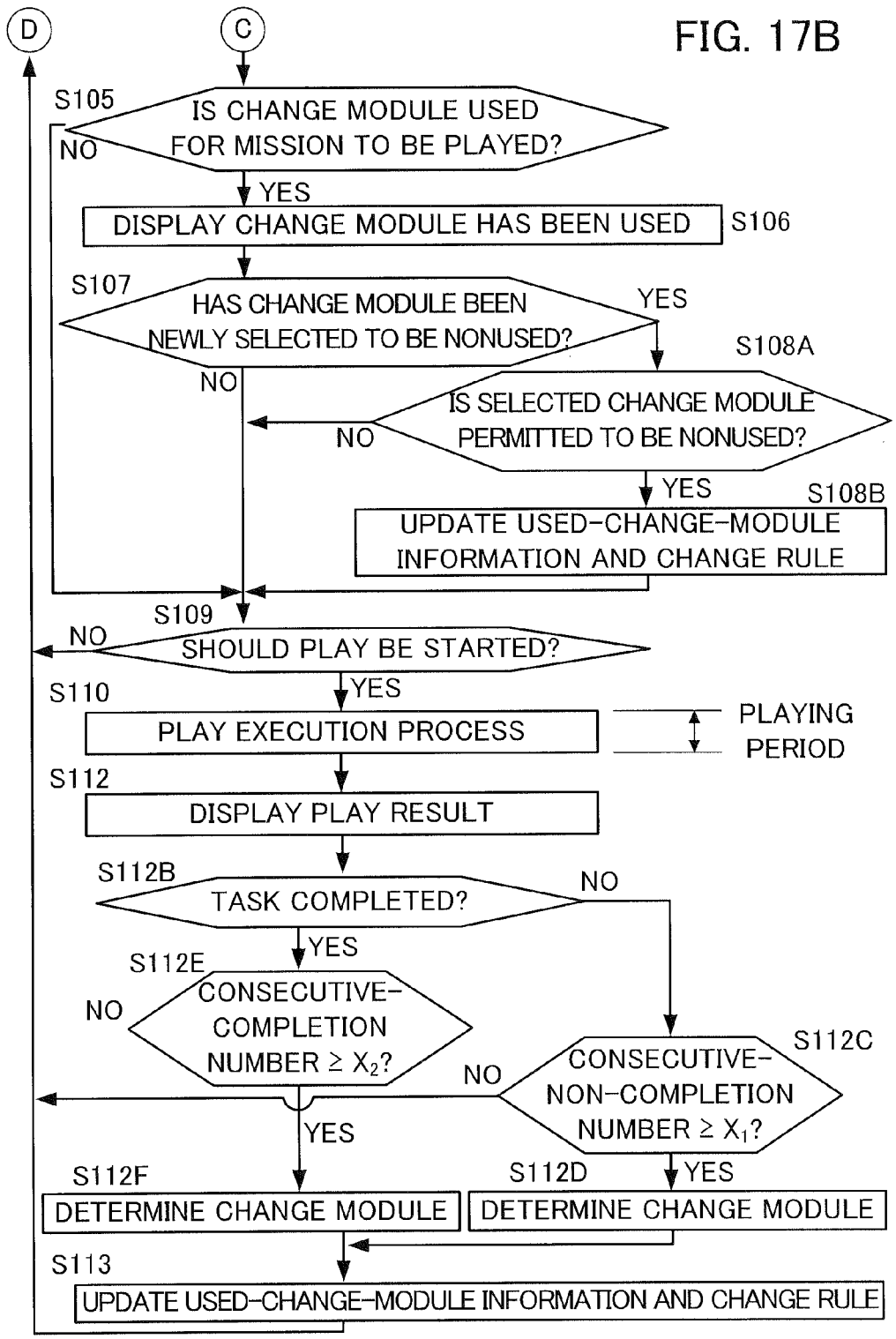
FIG. 17B is the other portion of the flow chart showing the game process according to the sixth embodiment of the present invention.

FIGS. 17A and 17B constitute a flow chart showing the game process which the processor of a game device according to the sixth embodiment executes in accordance with the computer program. In the game process, processor 111 decides whether or not there is play-history information 113C to be loaded (step S101). The decision result is NO when storage medium M2 has not been set in second reader 115 or when storage medium M2 set in second reader 115 has not stored play-history information 113C. Otherwise the decision result is YES.

When the decision result of step S101 is YES, processor 111 loads play-history information 113C (step S102). More specifically, processor 111 reads play-history information 113C from storage medium M2 and stores the play-history information into RAM 113. Subsequently, the process proceeds to step S103. When the decision result of step S101 is NO, processor 111 executes initialization (step S103). More specifically, processor 111 stores play-history information 113C that indicates that all of the tasks have not been completed, that there has not been any used change module, etc., into RAM 113. Subsequently, the process proceeds to step S103.

In step S102A, processor 111 specifies a stage to be played. The first stage (FIG. 1) is specified directly after starting the game process. The first stage is specified after failing to complete any task. The first stage is also specified after completion of the qualification-for-progress task of the final stage, that is, directly after completion of one round. Directly after completion of the qualification-for-progress task of any one of the first stage to the (n−1)th stage, the next stage is specified. Directly after completion of any one of normal tasks, the stage to which the completed normal task belongs is specified.

Next, processor 111 executes a task selection process (unit game selection process) prompting the player to select a single task from the tasks of the specified stage (step S104).

In step S5, processor 111 decides whether or not a change module is used for the task selected to be played. As described above, a change module is not prepared for all of the tasks, but may be prepared for several tasks. Although a change module is prepared for a task, it is possible not to provide the change module to the player, depending on the player's record. When no change module is used for the selected task, the process proceeds to step S109. On the other hand, when change modules are used for the selected task, the process proceeds to step S106.

In step S106, processor 111 causes display 21 to show change modules which have been used. Afterward, processor 111 decides whether or not a change module is selected for nonuse (step S107). The decision result is YES when a signal representing a change module which should be discontinued to be used has been supplied from manual interface 116 resulting from the player's instruction to discontinue use of the change module which has been used. When the decision result of step S107 is YES, processor 111 decides whether or not nonuse of the change module selected to be discontinued to be used by the player is permitted (step S108A). That is, processor 111 decides whether or not a requirement stored in RAM 113 to be achieved during play of the computer game in order to discontinue use of the change module is achieved. More specifically, processor 111 searches for play result information which describes a play result satisfying the requirement in play-history information 113C stored in RAM 113. If the play result information which describes the play result satisfying the requirement is found, the decision of step S108A is YES, and the process proceeds to step S108B. Otherwise, the process proceeds to step S109.

In step S108B, processor 111 updates the used-change-module information of play-history information 113C stored in RAM 113 so as not to represent the designated change module. In addition, processor 111 (difficulty restorer) rewrites the rule corresponding to the change module among rules 113B stored in RAM 113 so as to cancel the change in the level of difficulty for completion of the task corresponding to the change module. Thus, since the requirement excepting the player's intention is set to discontinue use of a used change module, the player's motivation in the game can be stimulated to satisfy the requirement.

In step S109, processor 111 decides whether or not a play should be started. The decision result is YES when a signal instructing to start a play has been supplied from manual interface 116 resulting from the player's decision to start the play. When the decision result of step S109 is NO, the process returns to step S102A. That is, processor 111 repeats steps S102A to S109 until the decision result of step S109 becomes YES.

When the decision result of step S109 is YES, processor 111 executes a play execution process that executes a play of the selected task (step S110). The play is executed in accordance with a rule stipulating a content of play (sequence and tempo) among rules 113B stored in RAM 113. In the play execution process, processor 111 evaluates the conformity of the player's manipulations to the standard dance assigned to the selected task for the playing period, and based on the evaluation, processor 111 enumerates a miss count and calculates a score. The enumeration and the calculation are performed in accordance with rules stored in RAM 113. For instance, if the rules have been changed to count two misses as a "one miss", two misses are counted as a "one miss".

Once the play execution process has terminated, the result of the play is worked out and displayed on display 21 (step S112). The result of the play includes a miss count, a score, etc. Then, processor 111 decides whether or not the task is completed based on the worked-out result of the play and rules stipulating the requirement for completion of the played task among rules 113B stored in RAM 113 (rule storage unit) (step S112B).

When the task has not been completed, the process proceeds to step S112C in which processor 111 works as a consecutive-non-completion number determiner for deciding the number of consecutive plays in which the player has been decided not to complete the task (consecutive-non-completion number) based on play-history information 113C in RAM 113. Processor 111 also works as a comparer for comparing the consecutive-non-completion number with a first limit value $X_1$. When the consecutive-non-completion number is less than first limit value $X_1$, the process proceeds to step S113.

When the consecutive-non-completion number is greater than first limit value $X_1$, the process proceeds to step S112D in which processor 111 determines a change module lowering of the level of difficulty for completion of the task. That is, a candidate for a change module for lowering the level of difficulty for completion is assigned to a low-skill player. Afterwards, the process proceeds to step S113.

When the task has been completed, the process proceeds to step S112E in which processor 111 works as a consecutive-completion number determiner for deciding the number of consecutive plays in which the player has been decided to complete the task (consecutive-completion number) based on play-history information 113C in RAM 113. Processor 111 also works as a comparer for comparing the consecutive-completion number with a second limit value $X_2$. When the consecutive-completion number is less than the second limit value $X_2$, the process proceeds to step S113.

When the consecutive-completion number is greater than the second limit value $X_2$, the process proceeds to step S112F and processor 111 determines a change module for raising the level of difficulty for completion of the task. That is, a candidate for a change module for raising the level of difficulty for completion is assigned to a high-skill player. Afterwards, the process proceeds to step S113. However, if a change module is not originally prepared for the played task, the process directly proceeds to step S113 after step S112B regardless of the decision of step S112B.

In step S113, play-history information 113C (FIG. 16) stored in RAM 113 is updated based on the result of the play worked out at step S112 and the decision result of step S112B, and the updated play-history information 113C is copied into storage medium M2 if storage medium M2 is set in second reader 115. At the update at step S113, regarding this play of this task, the task-identifying information element, the play count information element, the round information element, the play result information element, and the change-module-identifying information element are added. In addition, at the update, when the last step before step S113 is step S112D or step S112F, the change module specified at step S112D or S112F is provided and used. That is, the used-change-module information is updated so as to represent the change module.

If the last step before step S113 is step S112D or step S112F, processor 111 rewrites the rule corresponding to the change module among rules 113B stored in RAM 113 so as to activate the change effect described in the newly used change module. If the change module has a change effect to change the requirement for completion of a task, in step S113, processor 111 changes the rule stipulating the requirement for completion in accordance with the change module. If the change module has a change effect to change the level of difficulty in play (specifically, tempo) of a task, in step S113, processor 111 changes the rule stipulating the level of difficulty in play in accordance with the change module. Thus, processor 111 works as a difficulty changer which rewrites a rule stored in RAM 113 that is a rule storage unit. After the end of step 113, the process returns to step S102A.

As explained above, according to game device 10 of the embodiment, since it is possible to change levels of difficulty for completion (at least any one of a requirement for completion or a level of difficulty of play) of several unit games (tasks), it is possible to set a level of difficulty for completion of a task appropriately for the player without large-scale experimentation. Therefore, it is possible to reduce time and effort for designing the game so as to control an appropriate difference of levels of difficulty for completion between tasks in two successive stages.

In this embodiment, a level of difficulty for completion of a task can be modified corresponding to past records regarding completion of the task. Moreover, if the player feels that a change module which has been used is not preferable, in step S108B, the player can cancel the change module at a use-and-nonuse setting process. In step S108B, processor 111, that is, a difficulty restorer, rewrites a rule in RAM 113 so as to restore a level of difficulty for completion of a task. In another embodiment, for instance, restoration of a level of difficulty for completion may be triggered by specific operation by the player or other events so that steps of restoration of a level of difficulty by the player should be reduced. For instance, with respect to a specific change module, if the above-described requirement to be achieved during play of the computer game in order to discontinue use of the change module is satisfied, the change module may be automatically cancelled.

In this embodiment, processor 111 decides whether or not a requirement stored in RAM 113 to be achieved during play of the computer game in order to discontinue use of the change module is satisfied. Thus, since the requirement excepting the player's intention is set to discontinue use of a used change module, the player's motivation of the game can be stimulated to satisfy the requirement.

In this embodiment, a change module is used for changing a rule stipulating a level of difficulty for completion of a task. In another embodiment, a rule may be changed without using a change module.

Other Variations and Modifications

An above-described embodiment may be modified to include a game device excepting a home video game machine. A so-called arcade game device may be exemplified as such a game device. In the arcade game device, for instance, a hard disk drive corresponds to storage medium M1, and a storage medium carried by the player corresponds to storage medium M2. In another embodiment, information stored in storage medium M2 of the above-described embodiments may be stored in a server device that is able to communicate with the arcade game device via a network.

Each of the above-described embodiments is intended for a finger dance game; however, they may be modified to include a timing operation game excepting the finger dance game.

Each game of the above-described embodiments includes multiple tasks (unit games) in each task. However, this invention is applicable to a game in which each stage can be regarded as a unit game because only a single unit game is included in each stage. In such a game, once the player completes a stage, the player can proceed to the next stage or can select a stage to be played next.

Each of the above-described embodiments can be combined with each other unless there is contradiction in the combination. For instance, the fifth embodiment or the sixth embodiment can be combined with the third embodiment. Alternatively, the fifth embodiment or the sixth embodiment can be combined with the fourth embodiment.

Although specific embodiments of the present invention are described above, the present invention also can be implemented as computer programs that contain machine-readable command sequences describing methods in the above-disclosed game device, or a program product that has these computer programs. The "program product" may be a machine-readable information storage medium that stores the computer programs, or may be a data carrier that carries the computer programs. The "information storage medium" may be various types of disks, tapes, chips, or data sticks, other than the above-described embodiments. The "data carrier" may be various types of networks, either wired or wireless. The "program" may be compiled or not compiled.

The invention claimed is:

1. A game device comprising:
a rule storage unit for storing rules of a computer game comprising plural unit games, each of which can be completed when a requirement for completion is satisfied, the rules comprising rules stipulating the requirement for completion of each of the plural unit games and rules stipulating a content of play of each of the plural unit games;
a notifier for outputting a signal for informing a player of a candidate for a change module for changing a level of difficulty for completion of at least one unit game among the plural unit games;
a difficulty changer for rewriting a rule stored in the rule storage unit, when the candidate for the change module is selected to be used by the player, so as to change the level of difficulty for completion of the unit game in accordance with the selected change module; and
a play processor for conducting a unit game selection process for enabling the player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit.

2. The game device according to claim 1, wherein the difficulty changer rewrites the rule stored in the rule storage unit so as to change the requirement for completion of the unit game.

3. A game device comprising:
a rule storage unit for storing rules of a computer game comprising plural unit games, each of which can be completed when a requirement for completion is satisfied, the rules comprising rules stipulating the requirement for completion of each of the plural unit games and rules stipulating a content of play of each of the plural unit games;
a notifier for outputting a signal for informing a player of plural candidates for a change module for changing a level of difficulty for completion of at least one unit game among the plural unit games;
a difficulty changer for rewriting a rule stored in the rule storage unit so as to change the level of difficulty for completion of the unit game in accordance with a change module selected from among the plural candidates to be used by the player; and
a play processor for conducting a unit game selection process for enabling the player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit.

4. The game device according to claim 3, wherein the difficulty changer rewrites the rule stored in the rule storage unit so as to change the requirement for completion of the unit game.

5. The game device according to claim 1, further comprising:
a change module storage unit for storing the change module selected to be used by the player as a used change module; and
a used-change-module notifier for outputting a signal for informing the player of the used change module stored in the change module storage unit, when the player instructs not to use the used change module, the change module storage unit stores the used change module as a nonused change module and the difficulty changer rewrites the rule stored in the rule storage unit so as to cancel the change of the level of difficulty for completion of the unit game based on the change module.

6. The game device according to claim 5, wherein the rule storage unit stores a rule stipulating a requirement to be achieved during play of the computer game for discontinuing use of the change module already used by the player, and wherein as long as the requirement is satisfied, the change module storage unit stores the used change module as a nonused change module and the difficulty changer rewrites the rule stored in the rule storage unit so as to cancel the change of the level of difficulty for completion of the unit game based on the change module.

7. The game device according to claim 3, the plural candidates informed by the notifier comprising a change module for lowering the level of difficulty of completion and a change module for raising the level of difficulty of completion.

8. The game device according to claim 1, further comprising a difficulty-history notifier for outputting a signal for reporting information on the level of difficulty of completion of each of the plural unit games having played by the player upon completion of a specific unit game among the plural unit games.

9. The game device according to claim 1, wherein the notifier outputting a signal for informing the player of a change effect caused by use of each candidate for the change module together with the candidates.

10. The game device according to claim 5, wherein a number is assigned to each of the candidates for the change module, the game device further comprising a change-module-use permitter for enabling the player to use the candidate for the change module when a sum of the number assigned to a change module already used by the player and stored in the change module storage unit and the number assigned to the candidate of the change module newly selected to be used by the player is equal to or less than a threshold.

11. The game device according to claim 1, further comprising an optimal-change-module determiner, upon selecting a unit game in the unit game selection process, referring to plural candidates of a change module for changing the level of difficulty for completion of the unit game and to information on the skill of a player with respect to a play of the computer game, the optimal-change-module determiner determining from among the candidates a change module for changing the level of difficulty for completion of the unit game into the level estimated as optimal for the skill of the player, the notifier outputting a signal for recommending to the player the change module determined by the optimal-change-module determiner.

12. A game device comprising:
a rule storage unit for storing rules of a computer game comprising plural unit games, each of which can be completed when a requirement for completion is satisfied, the rules comprising rules stipulating the requirement for completion of each of the plural unit games and rules stipulating a content of play of each of the plural unit games;

a difficulty changer for rewriting a rule stored in the rule storage unit so as to change a level of difficulty for completion of at least one unit game among the plural unit games;

a play processor for conducting a unit game selection process for enabling a player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit;

a consecutive-non-completion number determiner for determining a consecutive-non-completion number which is a number of consecutive plays for which the decision process by the play processor has decided that the unit game has not been completed;

a comparer for comparing a first limit value with the consecutive-non-completion number; and a notifier for outputting a signal for informing the player of a candidate for a change module for lowering the level of difficulty for completion of the unit game when the comparer decides that the consecutive-non-completion number is equal to or greater than the first limit value, wherein when the candidate for the change module is selected to be used by the player, the difficulty changer rewrites a rule stored in the rule storage unit so as to lower the level of difficulty for completion of the unit game in accordance with the selected change module.

13. A game device comprising:

a rule storage unit for storing rules of a computer game comprising plural unit games, each of which can be completed when a requirement for completion is satisfied, the rules comprising rules stipulating the requirement for completion of each of the plural unit games and rules stipulating a content of play of each of the plural unit games;

a difficulty changer for rewriting a rule stored in the rule storage unit so as to change a level of difficulty for completion of at least one unit game among the plural unit games;

a play processor for conducting a unit game selection process for enabling a player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit;

a consecutive-completion number determiner for determining a consecutive-completion number which is a number of consecutive plays for which the decision process by the play processor has decided that the unit game has been completed;

a comparer for comparing a second limit value with the consecutive-completion number; and a notifier for outputting a signal for informing the player of a candidate for a change module for raising the level of difficulty for completion of the unit game when the comparer decides that the consecutive-completion number is equal to or greater than the second limit value, wherein when the candidate for the change module is selected to be used by the player, the difficulty changer rewrites a rule stored in the rule storage unit so as to raise the level of difficulty for completion of the unit game in accordance with the selected change module.

14. The game device according to claim 12, wherein the rule storage unit stores a rule stipulating a requirement to be achieved during play of the computer game for restoring the level of difficulty for completion of the unit game, the game device further comprising a difficulty restorer for rewriting a rule stored in the rule storage unit so as to restore the level of difficulty for completion of the unit game insofar as the requirement is satisfied.

15. The game device according to claim 13, wherein the rule storage unit stores a rule stipulating a requirement to be achieved during play of the computer game for restoring the level of difficulty for completion of the unit game, the game device further comprising a difficulty restorer for rewriting a rule stored in the rule storage unit so as to restore the level of difficulty for completion of the unit game insofar as the requirement is satisfied.

16. A game device comprising:

a rule storage unit for storing rules of a computer game comprising plural unit games, each of which can be completed when a requirement for completion is satisfied, the rules comprising rules stipulating the requirement for completion of each of the plural unit games and rules stipulating a content of play of each of the plural unit games;

a difficulty changer for rewriting a rule stored in the rule storage unit so as to change a level of difficulty for completion of at least one unit game among the plural unit games;

a play processor for conducting a unit game selection process for enabling a player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit;

a consecutive-non-completion number determiner for determining a consecutive-non-completion number which is a number of consecutive plays for which the decision process by the play processor has decided that the unit game has not been completed; and a comparer for comparing a first limit value with the consecutive-non-completion number, wherein when the comparer decides that the consecutive-non-completion number is equal to or greater than the first limit value, the difficulty changer rewrites a rule stored in the rule storage unit so as to lower the level of difficulty for completion of the unit game.

17. A game device comprising:

a rule storage unit for storing rules of a computer game comprising plural unit games, each of which can be completed when a requirement for completion is satisfied, the rules comprising rules stipulating the requirement for completion of each of the plural unit games and rules stipulating a content of play of each of the plural unit games;

a difficulty changer for rewriting a rule stored in the rule storage unit so as to change a level of difficulty for completion of at least one unit game among the plural unit games;

a play processor for conducting a unit game selection process for enabling a player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit;

a consecutive-completion number determiner for determining a consecutive-completion number which is a number of consecutive plays for which the decision process by the play processor has decided that the unit game has been completed; and a comparer for comparing a second limit value with the consecutive-completion number, wherein when the comparer decides that the consecutive-completion number is equal to or greater than the second limit value, the difficulty changer rewrites a rule stored in the rule storage unit so as to raise the level of difficulty for completion of the unit game.

18. The game device according to claim 16, wherein the rule storage unit stores a rule stipulating a requirement to be achieved during play of the computer game for restoring the level of difficulty for completion of the unit game, the game device further comprising a difficulty restorer for rewriting a rule stored in the rule storage unit so as to restore the level of difficulty for completion of the unit game insofar as the requirement is satisfied.

19. The game device according to claim 17, wherein the rule storage unit stores a rule stipulating a requirement to be achieved during play of the computer game for restoring the level of difficulty for completion of the unit game, the game device further comprising a difficulty restorer for rewriting a rule stored in the rule storage unit so as to restore the level of difficulty for completion of the unit game insofar as the requirement is satisfied.

20. A non-transitory computer-readable medium encoded with instructions comprising a computer program used in a computer comprising a rule storage unit for storing rules of a computer game comprising plural unit games each of which can be completed when a requirement for completion is satisfied, the rules comprising rules stipulating the requirement for completion of each of the plural unit games and rules stipulating a content of play of each of the plural unit games, the computer program causing the computer to serve as:

a notifier for outputting a signal for informing a player of a candidate for a change module for changing a level of difficulty for completion of at least one unit game among the plural unit games;

a difficulty changer for rewriting a rule stored in the rule storage unit, when the candidate for the change module is selected to be used by the player, so as to change the level of difficulty for completion of the unit game among the plural unit games in accordance with the selected change module; and a play processor for conducting a unit game selection process for enabling the player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit.

21. A non-transitory computer-readable medium encoded with instructions comprising a computer program used in a computer comprising a rule storage unit for storing rules of a computer game comprising plural unit games each of which can be completed when a requirement for completion is satisfied, the rules comprising rules stipulating the requirement for completion of each of the plural unit games and rules stipulating a content of play of each of the plural unit games, the computer program causing the computer to serve as:

a notifier for outputting a signal for informing a player of plural candidates for a change module for changing a level of difficulty for completion of at least one unit game among the plural unit games;

a difficulty changer for rewriting a rule stored in the rule storage unit so as to change the level of difficulty for completion of the unit game in accordance with a change module selected from among the plural candidates to be used by the player; and a play processor for conducting a unit game selection process for enabling the player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit.

22. A non-transitory computer-readable medium encoded with instructions comprising a computer program used in a computer comprising a rule storage unit for storing rules of a computer game comprising plural unit games each of which can be completed when a requirement for completion is satisfied, the rules comprising rules stipulating the requirement for completion of each of the plural unit games and rules stipulating a content of play of each of the plural unit games, the computer program causing the computer to serve as:

a difficulty changer for rewriting a rule stored in the rule storage unit so as to change a level of difficulty for completion of at least one unit game among the plural unit games;

a play processor for conducting a unit game selection process for enabling a player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit;

a consecutive-non-completion number determiner for determining a consecutive-non-completion number which is a number of consecutive plays for which the decision process by the play processor has decided that the unit game has not been completed;

a comparer for comparing a first limit value with the consecutive-non-completion number; and a notifier for outputting a signal for informing the player of a candidate for a change module for lowering the level of difficulty for completion of the unit game when the comparer decides that the consecutive-non-completion number is equal to or greater than the first limit value, wherein when the candidate for the change module is selected to be used by the player, the difficulty changer rewrites a rule stored in the rule storage unit so as to lower the level of difficulty for completion of the unit game in accordance with the selected change module.

23. A non-transitory computer-readable medium encoded with instructions comprising a computer program used in a computer comprising a rule storage unit for storing rules of a computer game comprising plural unit games each of which can be completed when a requirement for completion is satisfied, the rules comprising rules stipulating the requirement for completion of each of the plural unit games and rules stipulating a content of play of each of the plural unit games, the computer program causing the computer to serve as:

a difficulty changer for rewriting a rule stored in the rule storage unit so as to change a level of difficulty for completion of at least one unit game among the plural unit games;

a play processor for conducting a unit game selection process for enabling a player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit;

a consecutive-completion number determiner for determining a consecutive-completion number which is a number of consecutive plays for which the decision process by the play processor has decided that the unit game has been completed;

a comparer for comparing a second limit value with the consecutive-completion number; and a notifier for outputting a signal for informing the player of a candidate for a change module for raising the level of difficulty for completion of the unit game when the comparer decides that the consecutive-completion number is equal to or greater than the second limit value, wherein when the candidate for the change module is selected to be used by the player, the difficulty changer rewrites a rule stored in the rule storage unit so as to raise the level of difficulty for completion of the unit game in accordance with the selected change module.

24. A non-transitory computer-readable medium encoded with instructions comprising a computer program used in a computer comprising a rule storage unit for storing rules of a computer game comprising plural unit games each of which can be completed when a requirement for completion is satisfied, the rules comprising rules stipulating the requirement for completion of each of the plural unit games and rules stipulating a content of play of each of the plural unit games, the computer program causing the computer to serve as:

a difficulty changer for rewriting a rule stored in the rule storage unit so as to change a level of difficulty for completion of at least one unit game among the plural unit games;

a play processor for conducting a unit game selection process for enabling a player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit;

a consecutive-non-completion number determiner for determining a consecutive-non-completion number which is a number of consecutive plays for which the decision process by the play processor has decided that the unit game has not been completed; and a comparer for comparing a first limit value with the consecutive-non-completion number, wherein when the comparer decides that the consecutive-non-completion number is equal to or greater than the first limit value, the difficulty changer rewrites a rule stored in the rule storage unit so as to lower the level of difficulty for completion of the unit game.

25. A non-transitory computer-readable medium encoded with instructions comprising a computer program used in a computer comprising a rule storage unit for storing rules of a computer game comprising plural unit games each of which can be completed when a requirement for completion is satisfied, the rules comprising rules stipulating the requirement for completion of each of the plural unit games and rules stipulating a content of play of each of the plural unit games, the computer program causing the computer to serve as:

a difficulty changer for rewriting a rule stored in the rule storage unit so as to change a level of difficulty for completion of at least one unit game among the plural unit games;

a play processor for conducting a unit game selection process for enabling a player to select one from among the plural unit games, a play execution process for executing play of the selected unit game in accordance with the rule stipulating the content of play stored in the rule storage unit, and a decision process for deciding whether or not the unit game is completed on the basis of the rule stipulating the requirement for completion stored in the rule storage unit;

a consecutive-completion number determiner for determining a consecutive-completion number which is a number of consecutive plays for which the decision process by the play processor has decided that the unit game has been completed; and a comparer for comparing a second limit value with the consecutive-completion number, wherein when the comparer decides that the consecutive-completion number is equal to or greater than the second limit value, the difficulty changer rewrites a rule stored in the rule storage unit so as to raise the level of difficulty for completion of the unit game.

* * * * *